US012282565B2

(12) United States Patent
Cameron et al.

(10) Patent No.: US 12,282,565 B2
(45) Date of Patent: Apr. 22, 2025

(54) GENERATIVE CYBERSECURITY EXPLOIT SYNTHESIS AND MITIGATION

(71) Applicant: Citibank, N.A., New York, NY (US)

(72) Inventors: William Franklin Cameron, Jacksonville, FL (US); Pramod Goyal, Ahmedabad (IN); Prithvi Narayana Rao, Allen, TX (US); Manjit Rajaretnam, Irving, TX (US); Miriam Silver, Tel Aviv (IL)

(73) Assignee: CITIBANK, N.A., New York, NY (US)

(*) Notice: Subject to any disclaimer, the term of this patent is extended or adjusted under 35 U.S.C. 154(b) by 0 days.

(21) Appl. No.: 18/792,523

(22) Filed: Aug. 1, 2024

(65) Prior Publication Data

US 2025/0036777 A1    Jan. 30, 2025

Related U.S. Application Data

(63) Continuation-in-part of application No. 18/607,141, filed on Mar. 15, 2024, which is a continuation-in-part of application No. 18/399,422, filed on Dec. 28, 2023, which is a continuation of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No.
(Continued)

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01)

(58) Field of Classification Search
CPC ............................ G06F 21/577; G06F 21/552
See application file for complete search history.

(56) References Cited

U.S. PATENT DOCUMENTS 8,380,817 B2    2/2013   Okada
8,387,020 B1    2/2013   Maclachlan et al.
(Continued)

FOREIGN PATENT DOCUMENTS

WO    2021160499 A1    8/2021

OTHER PUBLICATIONS

International Search Report and Written Opinion Received received in Application No. PCT/US23/85942, dated Feb. 15, 2024, 6 pages.
(Continued)

*Primary Examiner* — Stephen T Gundry
(74) *Attorney, Agent, or Firm* — Perkins Coie LLP

(57) ABSTRACT

Described herein are systems and methods for identifying security vulnerabilities. The systems and methods herein can utilize security vulnerability information to identify potential security threats and can utilize this information to generate an attack using a machine learning model, such as a large language model. Generated attacks can be carried out to assess impact of a security vulnerability. An output can be provided that represents the assessed impact. In some implementations, the systems and methods herein generate patches or other mitigations for security vulnerabilities, which can be tested and deployed to address security vulnerabilities.

20 Claims, 11 Drawing Sheets

Related U.S. Application Data

18/098,895, filed on Jan. 19, 2023, now Pat. No. 11,748,491.

(56) References Cited

U.S. PATENT DOCUMENTS

| | | | |
|---|---|---|---|
| 10,620,988 B2 | 4/2020 | Lauderdale et al. | |
| 10,943,067 B1 | 3/2021 | Brown et al. | |
| 11,042,647 B1 | 6/2021 | Joyce et al. | |
| 11,133,942 B1 | 9/2021 | Griffin | |
| 11,227,187 B1 | 1/2022 | Weinberger | |
| 11,328,068 B1 | 5/2022 | Niedzwiedz et al. | |
| 11,410,136 B2 | 8/2022 | Cook et al. | |
| 11,516,222 B1 | 11/2022 | Srinivasan et al. | |
| 11,706,241 B1 | 7/2023 | Cross et al. | |
| 11,720,686 B1 | 8/2023 | Cross et al. | |
| 11,734,418 B1 | 8/2023 | Epstein | |
| 12,028,368 B1 | 7/2024 | Cohen et al. | |
| 12,135,949 B1* | 11/2024 | Cameron | G06F 40/40 |
| 12,149,553 B1* | 11/2024 | Fly | H04L 63/1433 |
| 12,149,558 B1* | 11/2024 | Brown | H04L 63/1433 |
| 12,155,781 B1* | 11/2024 | Helfgott | G06F 21/6218 |
| 12,182,258 B2 | 12/2024 | Stokes et al. | |
| 2003/0007178 A1 | 1/2003 | Jeyachandran et al. | |
| 2004/0098454 A1 | 5/2004 | Trapp et al. | |
| 2005/0204348 A1 | 9/2005 | Horning et al. | |
| 2006/0095918 A1 | 5/2006 | Hirose | |
| 2007/0067848 A1 | 3/2007 | Gustave et al. | |
| 2010/0275263 A1 | 10/2010 | Bennett et al. | |
| 2010/0313189 A1 | 12/2010 | Beretta et al. | |
| 2014/0137257 A1 | 5/2014 | Martinez et al. | |
| 2014/0258998 A1 | 9/2014 | Adl-Tabatabai et al. | |
| 2017/0061132 A1 | 3/2017 | Hovor et al. | |
| 2017/0295197 A1 | 10/2017 | Parimi et al. | |
| 2018/0020021 A1* | 1/2018 | Gilmore | H04L 63/1441 |
| 2018/0239903 A1 | 8/2018 | Bodin et al. | |
| 2018/0343114 A1 | 11/2018 | Ben-Ari | |
| 2019/0188706 A1 | 6/2019 | Mccurtis | |
| 2019/0236661 A1* | 8/2019 | Hogg | G06Q 30/0641 |
| 2019/0286816 A1 | 9/2019 | Fu | |
| 2020/0012493 A1 | 1/2020 | Sagy | |
| 2020/0074470 A1 | 3/2020 | Deshpande et al. | |
| 2020/0153855 A1 | 5/2020 | Kirti et al. | |
| 2020/0219009 A1 | 7/2020 | Dao et al. | |
| 2020/0233979 A1 | 7/2020 | Tahmasebi Maraghoosh et al. | |
| 2020/0259852 A1 | 8/2020 | Wolff et al. | |
| 2020/0309767 A1 | 10/2020 | Loo et al. | |
| 2020/0314191 A1 | 10/2020 | Madhavan et al. | |
| 2020/0349054 A1 | 11/2020 | Dai et al. | |
| 2020/0380118 A1 | 12/2020 | Miller et al. | |
| 2020/0387608 A1 | 12/2020 | Miller et al. | |
| 2021/0049288 A1 | 2/2021 | Li | |
| 2021/0089941 A1 | 3/2021 | Chen et al. | |
| 2021/0133182 A1 | 5/2021 | Anderson et al. | |
| 2021/0185094 A1 | 6/2021 | Waplington et al. | |
| 2021/0211431 A1 | 7/2021 | Albero et al. | |
| 2021/0256125 A1 | 8/2021 | Miller et al. | |
| 2021/0264547 A1 | 8/2021 | Li | |
| 2021/0273957 A1* | 9/2021 | Boyer | G06F 21/554 |
| 2021/0390465 A1 | 12/2021 | Werder et al. | |
| 2022/0050928 A1 | 2/2022 | Shukla et al. | |
| 2022/0114251 A1 | 4/2022 | Guim Bernat et al. | |
| 2022/0147636 A1 | 5/2022 | Mahuli et al. | |
| 2022/0286438 A1 | 9/2022 | Burke et al. | |
| 2022/0294789 A1* | 9/2022 | Tikhomirov | H04L 12/2816 |
| 2022/0334818 A1 | 10/2022 | Mcfarland | |
| 2022/0398149 A1 | 12/2022 | Mcfarland et al. | |
| 2022/0417274 A1 | 12/2022 | Madanahalli et al. | |
| 2023/0032686 A1 | 2/2023 | Williams et al. | |
| 2023/0035321 A1 | 2/2023 | Vijayaraghavan | |
| 2023/0052608 A1 | 2/2023 | Wattiau et al. | |
| 2023/0067128 A1 | 3/2023 | Engelberg et al. | |
| 2023/0071264 A1 | 3/2023 | Hakala et al. | |
| 2023/0076372 A1 | 3/2023 | Engelberg et al. | |
| 2023/0077527 A1 | 3/2023 | Sarkar | |
| 2023/0114719 A1 | 4/2023 | Thomas et al. | |
| 2023/0117962 A1 | 4/2023 | Kaimal et al. | |
| 2023/0118388 A1 | 4/2023 | Crabtree et al. | |
| 2023/0123314 A1 | 4/2023 | Crabtree et al. | |
| 2023/0132703 A1 | 5/2023 | Marsenic et al. | |
| 2023/0135660 A1 | 5/2023 | Chapman et al. | |
| 2023/0148116 A1 | 5/2023 | Stokes et al. | |
| 2023/0169397 A1 | 6/2023 | Smith et al. | |
| 2023/0205888 A1 | 6/2023 | Tyagi et al. | |
| 2023/0205891 A1 | 6/2023 | Yellapragada et al. | |
| 2023/0208869 A1 | 6/2023 | Bisht et al. | |
| 2023/0208870 A1 | 6/2023 | Yellapragada et al. | |
| 2023/0208871 A1* | 6/2023 | Yellapragada | G06N 3/045 726/25 |
| 2023/0229542 A1 | 7/2023 | Watkins et al. | |
| 2023/0259860 A1 | 8/2023 | Sarkar | |
| 2023/0269272 A1* | 8/2023 | Dambrot | H04L 63/1466 726/22 |
| 2023/0274003 A1 | 8/2023 | Liu et al. | |
| 2023/0362200 A1* | 11/2023 | Crabtree | G06F 16/2477 |
| 2023/0396641 A1* | 12/2023 | Hebbagodi | H04L 63/1433 |
| 2023/0412635 A1* | 12/2023 | Binyamini | G06N 5/022 |
| 2024/0054233 A1 | 2/2024 | Ohayon et al. | |
| 2024/0054249 A1 | 2/2024 | Loubet Moundi et al. | |
| 2024/0256678 A1* | 8/2024 | Thompson | H04L 9/3213 |
| 2024/0364749 A1* | 10/2024 | Crabtree | H04L 63/20 |
| 2024/0403428 A1* | 12/2024 | Lal | H04L 63/1441 |
| 2024/0403437 A1* | 12/2024 | Szigeti | G06F 21/577 |
| 2024/0403445 A1* | 12/2024 | Straub | G06F 11/3457 |
| 2024/0406145 A1* | 12/2024 | Crabtree | H04L 9/0894 |
| 2024/0411896 A1* | 12/2024 | Myers | G06F 21/552 |
| 2024/0414211 A1* | 12/2024 | Boyer | H04L 63/1416 |

OTHER PUBLICATIONS

Cranium, Adopt & Accelerate AI Safely, retrieved on Nov. 7, 2024, from https://cranium.ai/.

Farris, K., A., et al., "VULCON: A System for Vulnerability Prioritization, Mitigation, and Management," ACM Transactions on Privacy and Security, vol. 21, No. 4, Article 16. Publication date: Jun. 2018, 28 pages.

Coalition for Content Provenance and Authenticity, Contents Credentials C2PA Technological Specification, v2.1,Sep. 20, 2024. (Year: 2024).

Stokes, et al. "Preventing Machine Learning Poisoning Attacks Using Authentication and Provenance", MILCOM 2021-2021 IEEE Military Communications Conference (MILCOM), 2021, pp. 181-188. (Year: 2021).

* cited by examiner

| Patch Nutrition Label | Patch 1 | Patch 2 | Patch 3 |
|---|---|---|---|
| Platform | | | |
| AR | ● | ● | ● |
| MR | ● | ● | ● |
| Data Storage | | | |
| AR | ● | ● | ● |
| MR | ● | ● | ● |
| Network | | | |
| AR | ▲ | ▲ | ▲ |
| MR | ● | ■ | ▲ |
| Cryptography | | | |
| AR | ● | ● | ● |
| MR | ● | ● | ● |
| Performance Impact | ■ | ● | ● |
| Monitoring Effectiveness | ● | ■ | ▲ |
| ● Low | ■ Medium | ▲ High | |

FIG. 8

| Data Nutrition Label | Data 1 | Data 2 | Data 3 |
|---|---|---|---|
| Overall | ● | ■ | ▲ |
| Hash | ● | ● | ▲ |
| Signature | N/A | ● | N/A |
| Latency | ● | ■ | ● |
| Comparison | ● | ● | ● |

| ● Low | ■ Medium | ▲ High |
|---|---|---|

FIG. 11

GENERATIVE CYBERSECURITY EXPLOIT SYNTHESIS AND MITIGATION

CROSS-REFERENCE TO RELATED APPLICATIONS

This application is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" filed on Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023. The content of the foregoing applications is incorporated herein by reference in its entirety.

BACKGROUND

When determining whether a computing platform (e.g., a cloud-based computing platform, a mobile computing platform, a remote computing platform) or computing system is secure (e.g., safe to use), information security engineers (e.g., network engineers) often rely on publicly available information regarding the computing platforms and systems. However, this publicly available information can be filled with inaccuracies and may be outdated. For example, network engineers may be responsible for choosing the safest, fastest, and most scalable computing platform to provide services to another system. Of these factors, security of the computing platforms is of upmost importance as user data can be processed on such computing platforms and may be susceptible to a data breach if user data is not handled properly. As new security vulnerabilities are discovered by attackers in real-time, such vulnerabilities may be exploited and network engineers relying on publicly available information regarding the security of a computing platform may be unaware of the newly discovered security vulnerabilities as they are not published in the public domain.

Moreover, network engineers employing manual techniques to determine whether the given computing platform or system is impacted by one or more security vulnerabilities often leads to errors and is based on subjective opinion of the engineer. As data relied upon for making such determinations takes time to publish, attackers may exploit user and system data in real-time. Additionally, although such engineers may subjectively determine security vulnerabilities of a given system, determining which vulnerabilities are most threatening is further complicated by differing opinions of network engineers. As a large amount of time and other resources devoted to correcting security vulnerabilities, where network engineers disagree on which vulnerabilities should be corrected first, the computing platform and/or system may continue to be exploited. Moreover, the advent of artificial intelligence can be used maliciously, which attackers leverage to prevent detections of new threats (e.g., via masking computing platform/system updates) that cause advanced techniques to detect advanced threats. Without a way to determine whether a given computing platform is secure at a given moment in time and which vulnerabilities are to be corrected over others, user data may be stolen, system data may be held for ransom, and computing networks may be injected with malicious software unbeknownst to the network engineers until it is too late. These and other drawbacks exist.

BRIEF DESCRIPTION OF THE DRAWINGS

FIG. 8 is a drawing that illustrates an example security label for patches according to some implementations.

FIG. 11 is a drawing that shows an example security label for data retrieval according to some implementations.

Figure 1:
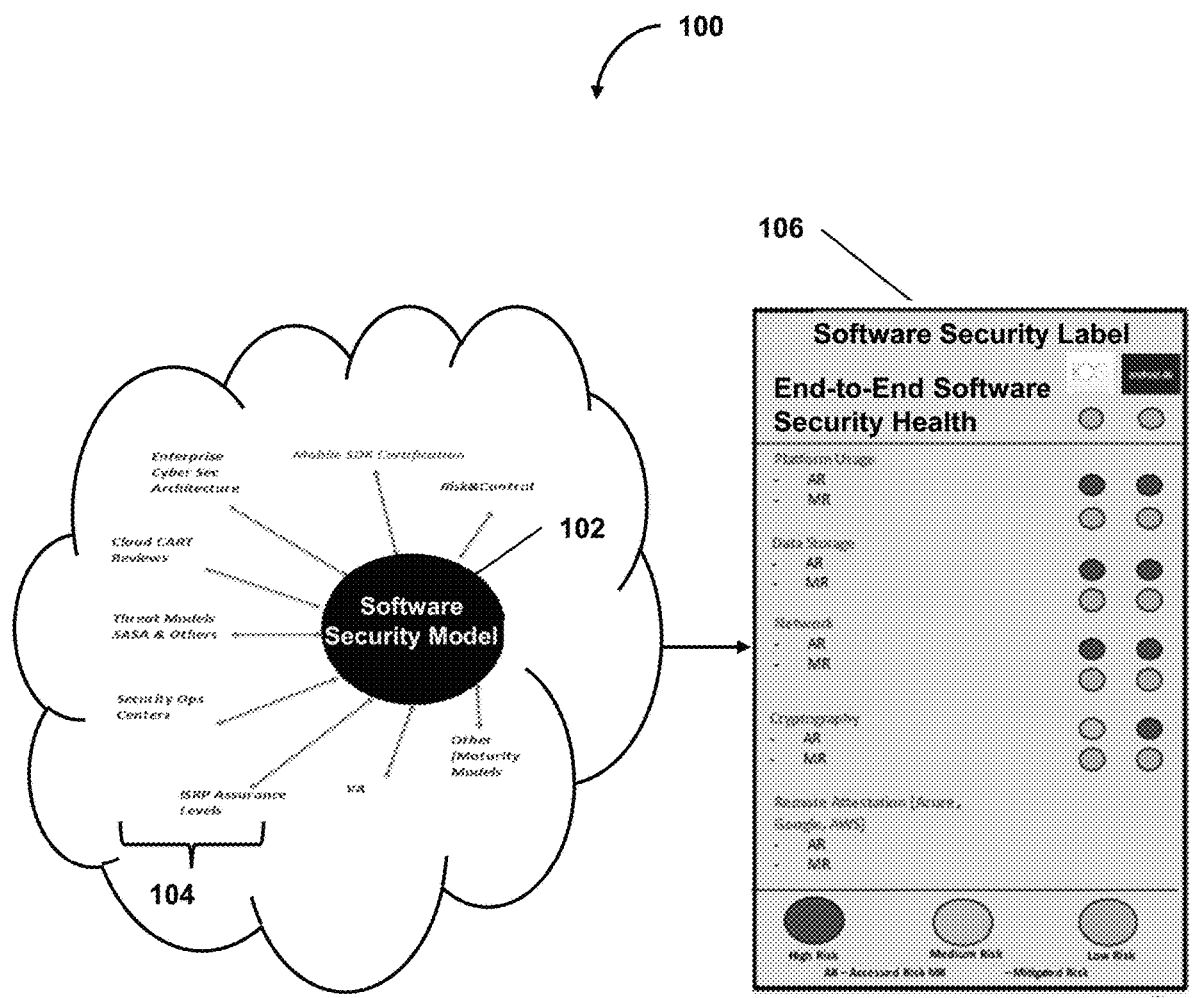
FIG. 1 is a block diagram showing an illustration of components used to determine platform-specific end-to-end security vulnerabilities and a graphical layout for displaying the platform-specific end-to-end security vulnerabilities via a Graphical User Interface (GUI).

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

There are many vulnerabilities that can affect computer systems, networks, etc., and new vulnerabilities emerge frequently, making it difficult to keep track of current vulnerabilities, take mitigation actions such as patching software or modifying network configurations, prioritize mitigation actions, and so forth. Some vulnerabilities can be easier to exploit than others. For example, some vulnerabilities may require detailed knowledge of various systems, may have certain library dependencies, may have certain network configuration dependencies, may depend on service configurations, and so forth. In some cases, even when a system is potentially vulnerable, this does not mean the vulnerability can actually be exploited, or it may be exceedingly difficult to exploit the vulnerability. For example, software installed on a server may have a vulnerability, but exploiting the vulnerability can be blocked by security controls such as permissions (e.g., remote access permissions, file access permissions, database access permissions, etc.), firewalls, etc. Additionally, different vulnerabilities can have different potential for adverse impacts. In some cases, the potential for adverse impacts can depend on how vulnerable software or hardware is used. For example, a vulnerability affecting a software library used for displaying promotional offers may be relatively inconsequential compared with another vulnerability in another software library (or even the same vulnerability in the same library) that is used for processing financial transactions.

Accordingly, it can be advantageous to conduct testing to determine which systems, networks, etc., are exploitable using a vulnerability. Manually preparing exploits to test for susceptibility to vulnerabilities can be a daunting task. Modern computing systems can include a wide variety of software, hardware, configurations, etc. Computing systems are often interconnected over networks that can include hardware such as switches, routers, load balancers, and so forth. There may be vulnerabilities related to hardware, software, networking equipment, and so forth. Vulnerabilities may be present on, for example and without limitation, servers, routers, switches, and/or end user devices such as smartphones, tablets, laptops, desktops, and so forth. Moreover, the threat landscape is constantly evolving, with old vulnerabilities being patched and new vulnerabilities being uncovered. In some cases, there may need to be different combinations of hardware, software, or both in order to successfully exploit a vulnerability. As an example, a vulnerability affecting certain Wi-Fi networking hardware may only be an issue if an end user device has not been patched, or a buffer overflow vulnerability in code running on a server may only be exploitable if an end user application is not updated to perform input validation that would prevent the submission of strings that could result in a buffer overflow. As another example, a vulnerability may rely on a misconfiguration for exploitation.

The vulnerability landscape can thus vary from end user to end user, depending upon, for example, the hardware, software, networks, and so forth used by end users to access a service, website, etc. Thus, it can be significant to conduct vulnerability testing that addresses the full breadth (or at least, a substantial portion thereof) of potential risks experienced by different users. Accordingly, the approaches described herein can be deployed to test company-controlled hardware, cloud infrastructure, networking equipment, and/or end user equipment. In some implementations, only some components may be tested. For example, vulnerability testing may be limited to servers or other cloud infrastructure, or can be limited to end user hardware, certain networking equipment, and so forth. The scope of vulnerability testing can depend on, for example, the particular vulnerability being tested, the potential for vulnerabilities on different devices, software applications, etc., to be used in combination to accomplish malicious activity, and so forth. Vulnerability testing can be further limited by the ability to conduct testing in a manner that does not overly adversely impact production systems. For example, some testing is conducted within a test environment, while other testing (e.g., testing that uses end user devices, cellular telecommunications services, etc.) may not be feasible to conduct entirely within a test environment. As an example, a particular wireless telecommunications company may use cellular hardware with a vulnerability, and it may not be feasible for individual companies to deploy similar cellular networking hardware for testing.

Patching vulnerabilities also carries significant risk for organizations. For example, a software or firmware update to address a vulnerability may introduce changes that break or compromise the functionality of systems, significantly impacts system performance, introduces compatibility issues, introduces other security vulnerabilities, and so forth. As an example, fixes to address the Spectre and Meltdown vulnerabilities resulted in noticeable performance degradation for certain workloads. In some cases, patches can introduce dependency conflicts, for example when shared libraries are used, can disrupt user activities, etc. In some cases, patches can result in data loss, or patch installation can fail, resulting in potentially complex recovery efforts. Thus, it can be important to test vulnerability patches thoroughly prior to deployment.

Vulnerability testing can help to identify vulnerabilities that could potentially affect production systems, interfere with user activity, and so forth. However, exploiting and patching vulnerabilities can require considerable knowledge and time. Thus, organizations may struggle to identify which vulnerabilities affect their systems, the potential impact of those vulnerabilities on their systems, the potential impacts of applying patches, and so forth. While security is critical to many businesses, there can be significant time and resource constraints that make thorough vulnerability testing and/or patch testing infeasible. As a result, organizations may fail to properly prioritize mitigation efforts, delay patching, etc., which can compromise security.

Analyzing vulnerabilities is often reactive, rather than proactive. That is, personnel may analyze logs, access patterns, etc., or may employ software that performs such analysis, may review software version information, and so forth. Such approaches can be valuable and can help to address many security issues. However, it can be significant to develop exploits and test for them before issues appear in production systems. Furthermore, even if issues have already appeared, it can be significant to perform testing that can help identify which systems are most at risk so that mitigation efforts can be undertaken in an orderly, prioritized manner, which can help limit any possible service disruptions. Determining a prioritization can be based on, for example, information contained on or accessible by an exposed system (also referred to herein as a vulnerable system) (e.g., personally identifiable information, financial information, etc.), potential impacts on system or service availability, potential abuse of the system to conduct fraudulent transactions (e.g., to create false records, false purchases, false financial transactions, etc.), and/or any other factor. In some implementations, a system can be configured to use Common Vulnerability Scoring System (CVSS) scores when determining prioritization. CVSS scores can factor in the impact of a vulnerability on confidentiality, integrity, and/or availability. Other scoring systems can also be used in addition to CVSS scores or as an alternative to CVSS scores.

As described herein, artificial intelligence/machine learning (AI/ML) models, such as large language models, can be used to generate exploits for testing vulnerabilities, to generate patches, to generate monitoring scripts, and/or for other security-related tasks, which can result in an improved security posture.

In some implementations, a large language model (LLM) is used to generate an exploit for one or more vulnerabilities, for example based on information obtained from one or more third-party security entities, such as common vulnerabilities and exposures (CVE) data. CVEs can be provided in a machine-interpretable format (e.g., JSON, CSV, HTML, etc.) and can include information such as a title, description, links to additional information, and so forth. In some cases, CVEs include relatively detailed information, such as affected versions, libraries, build configurations, and so forth. Alternatively, information may be less detailed but nonetheless useful, such as indicating that certain versions of software allow cross-site scripting, or may include somewhat more detailed information, such as indicating that a particular file in a larger package has a certain type of vulnerability or indicating that a particular field in a user interface can be used for SQL injection attacks. Some CVEs provide some guidance for how an exploit can be carried out, such as indicating that an authenticated user can perform a certain type of attack.

While much of this and the following discussion relates to CVEs, other data sources or types of data can be used additionally or alternatively, including data from third-party security entities, information collected by an organization, and so forth. In some implementations, information about prior vulnerabilities, exploits, etc., is used in generating exploits for vulnerabilities. For example, previous exploits and/or commonly known techniques are used by a system when generating an exploit for a different vulnerability.

The approaches described herein can utilize various external data sources. It can be important to verify the integrity and authenticity of data obtain from external data sources, for example to detect if data has been corrupted or tampered with during transit, after being downloaded, while at rest on a server, etc. Accordingly, some implementations provide approaches for verifying data obtain from external sources.

Given the complexity of differing security vulnerability threat vectors included in security vulnerability descriptions, end-users of software applications are often unable to determine whether a particular software application is secure or otherwise safe to use. For example, end-users often take for granted that an application made available from a trusted entity (e.g., service provider, software developer, corporation, company, open source developer, etc.) does not include security vulnerabilities that may make the user's sensitive data prone to a data leak, man-in-the-middle attack, or other security vulnerabilities/attacks. However, as malicious entities continue to test these software applications and the computing platforms or systems that interact with such applications by penetration testing or other security exploit discovery techniques, oftentimes such malicious entities discover new security vulnerabilities and may exploit them leaving user data prone to being stolen. As such, end-users of software applications may not have accurate or up-to-date information as to whether a software application they intend to use is impacted by a security vulnerability as attackers are continually implementing newly discovered exploits in real-time or near real-time.

Additionally, although software development teams developing software applications for end-users typically test their applications for such security vulnerabilities, these testing methods are generally limited due to time and cost. This combined with platform updates (e.g., cloud-based service provider updates, operating system updates, or other platform-related updates) often create/uncover new security vulnerabilities. Additionally, software developers often utilize third-party libraries and other third-party code in their software. This third-party code may change over time and, if such third-party libraries are updated over time, the security landscape of a software application may change over time even if the developer has not made changes to their own code. Although third-party security entities may provide information related to newly discovered cybersecurity threats (e.g., security vulnerabilities, threat vectors, method of possible attack, etc.), such information is often generic and not specific to a given software application being executed on a given platform. In addition to the complex information of these cyber security threats, end-users, as well as software development teams are often unaware of how these threat vectors may impact specific aspects (e.g., data storage, cryptographic communications, networking, etc.) of the software they are developing with respect to the specific platform.

Another common issue faced by network engineers is with respect to the security of one or more computing system platforms, such as cloud-based computing system platforms (e.g., cloud-based service providers, cloud computing systems), mobile application platforms (e.g., IOS, Android, Windows), or other computing environments and their interactions with each other. For example, due to the complexity of current computing system architecture involving multiple computing system platforms being interconnected, selecting a computing system platform to build a robust architecture for processing user data is a difficult task given the plethora of security vulnerabilities may be associated with each computing system platform. For instance, when selecting such computing system platforms that may process user data that is transferred from a mobile application of a mobile computing system platform to a cloud-based computing system platform, the network engineer must be aware of security vulnerabilities of each computing system platform. A large level of trust is often involved when selecting computing system platforms and network engineers must currently manually select which computing system platform to choose based on their opinion and what security-related information is available. However, such security information can be unreliable or outdated as new security vulnerabilities are discovered in real-time and/or masked via malicious use of AI, leading to a potential data leak of user data.

Yet another common issue faced by network engineers is with respect to providing accurate indications of security impact information of end-to-end computing systems, individual computing systems, individual software applications, etc. For example, in addition to the complexity of current computing system architectures, one security vulnerability present on a given computing component (e.g., a firewall, load balancer, server, etc.) may be associated or otherwise impact another security vulnerability present on another component (or the same component). Network engineers relying on their subjective opinion have no mechanism to accurately and consistently determine which security vulnerabilities are to be attended to over others, which security vulnerabilities impact other vulnerabilities, or which security vulnerabilities are most threatening or detrimental to user and system data. Although network engineers may perform research and rely on publicly available data concerning security vulnerabilities, updates to hardware or software within a computing system architecture may be updated, nullifying or rather amplifying the threat a given security vulnerability poses. Moreover, a network engineer may want to see at a higher level, which aspects of the computing system may be impacted by security vulnerabilities. For example, although security-vulnerability information may be directed to a single computing system component, that component may be part of a bigger picture (e.g., an aspect, category, or other class of computing system architecture). With no current mechanism to enable users (e.g., network engineers) to quickly and efficiently discover the most threatening security vulnerabilities and which aspects of an end-to-end computing system are impacted, delays in tending to security vulnerabilities may occur.

There is a need for determining, with respect to a given platform and the software being executed on the platform, how specific computing aspects (e.g., assessment domains) are impacted by a particular security vulnerability (or threat vector). There is a further need to convey this information in a user-friendly environment such that end-users are able to quickly and accurately determine whether a software application is safe to use. Moreover, there is a need to predict which computing aspects are impacted by security vulnerabilities (e.g., current security vulnerabilities or future security vulnerabilities) in real-time (or near real-time) to enable end-users to make informed decisions as to whether a software application the user intends to use is safe when new security vulnerabilities are discovered. Existing systems may provide generic security vulnerability-related information to software development teams, however, without determining how the generic security vulnerabilities impact different aspects of a specific platform with respect to the software application, the generic nature of the security vulnerability information is of minimal, if any, value and impact.

To overcome these and other deficiencies of existing systems, the inventors have developed a system for determining (i) what computing aspects of a software application executed on a given platform are impacted based on obtained security vulnerabilities (e.g., from a third-party security entity) and (ii) a visual indication of a level of impact for each computing aspect with respect to security vulnerabilities. For instance, the inventors have developed a specialized model that can determine, from a third-party security entity, security vulnerabilities that are specific to computing aspects of a software application being executed on a given platform. Using the obtained security vulnerabilities, the inventors have developed a method for determining a computing aspect impact level for each computing aspect of the software application with respect to the platform to enable users to make a clear and accurate determination to whether the software application is safe to use. Furthermore, the inventors have developed an improved user interface such that a user can easily identify whether the software application is safe to use based on a graphical representation of each computing aspect impact level with respect to the software application and the platform the software application is being executed on.

The inventors have further developed an improved method for determining comparative real-time end-to-end security vulnerabilities with respect to different infrastructure/architecture components, such as different cloud-based computing platforms, mobile computing system platforms, or other computing system environment components. The method determines a set of computing aspects associated with each respective component being compared (e.g., each cloud-based computing system platform) which can process a network operation in real-time (or near real-time). Using security-specification data and security vulnerability information associated with each component being compared, the system can determine computing-aspect impact levels compared to a comparative standard component being compared (e.g., a standard cloud-based computing system, a model cloud-based computing system, a guideline cloud-based computing system) to generate visual indications of each computing-aspect impact levels for each respective component to enable an easy identification of which component (e.g., cloud-based computing system) to choose. As such, by generating such visual indications, network engineers may select the "best" computing system platform based on up-to-date security vulnerability information to address user-specific requirements, such as to reduce the chance of a data breach of user data.

Due to the sheer number of variations of computing system platform-related security vulnerability information, there is a large amount of time spent attempting to identify how respective computing aspects are impacted by these complex combinations. For example, the hardware and software components that are associated with a given computing system platform may each be associated with their own respective security vulnerabilities which must be considered individually as well as how they impact one another when integrated with other computing system platforms. Furthermore, computer processing and memory resources are often wasted trying to identify how these computing aspects are impacted as existing systems and methods often rely on the software developer to perform hours-worth of research on the Internet, which leads to an increase in network traffic, an increase in computing memory required to process such requests, and wastes computer processing resources that could otherwise be available for other tasks, such as software development.

Additionally, as security vulnerabilities may be discovered in real-time by attackers, penetration testers, or hackers, security vulnerability information can be outdated, leading to the unidentified security vulnerabilities propagating throughout a given platform (e.g., a cloud-based computing system platform, cloud-based service provider, software application, mobile computing system platform, or other computing environment) for a long period of time, causing user data to be prone to a data breach or malicious software being installed to affect secure systems. Moreover, even when information is obtained with respect to each software application, platforms the software applications are executed on, the hardware and software components that control (or otherwise associated with the functions related to the software application), and the security vulnerabilities (e.g., of the hardware components, software components, and the platform), such information is often not in an easily understood format that may provide an overall "picture" of the end-to-end software application "health." This may lead to the software developer and/or end-user to misinterpret or simply miss any identified security vulnerabilities with respect to the software application due to the plethora of information. Thus, by optimizing the process in which specific computing aspects are identified in relation to a software application being executed on a given platform, determining a level of impact for each computing aspect, and providing a visual indication of such impact levels, the amount of computer processing and memory resources are decreased, as well as improving an end-user's understanding of the security of a software application they intend to use.

In various implementations, the methods and systems described herein can generate an improved graphical layout indicating computing-aspect-specific impact levels (e.g., as related to a software application and the platform the software application is being executed on) to indicate to an end-user a security profile associated with a software application in real-time. For example, a computing-aspect-mapping structure can be used to identify a set of computing aspects associated with a software application and the platform that the software application is being executed on. A set of security-vulnerability descriptions related to the platform (e.g., obtained by a security entity) is then obtained to determine a threat value for each security-vulnerability descriptions by using a platform-specific policy that indicates security impact information related to the security-vulnerability descriptions. Computing aspect impact levels for each computing aspect associated with the platform can be determined using the determined threat value for each security-vulnerability description. A graphical layout can then be displayed at a user interface, where the graphical layout comprises a graphical representation of each computing aspect impact level of each respective computing aspect of the set of computing aspects associated with the platform.

In various implementations, the methods and systems described herein can generate an improved graphical layout indicating overall-computing aspect impact levels for associated computing aspects of one computing system platform with respect to a comparative computing system platform to indicate to a user (e.g., end-user, network engineer, or system administrator) that a given computing system platform is secure. For example, the system can detect a user interaction at a webpage for a network operation, where the network operation indicates a processing of data from one computing system platform to a set of other computing system platforms. The system can determine a first set of computing aspects associated with each computing system platform of the set of computing system platforms (e.g., the other computing system platforms) based on the processing of the network operation to obtain security-related information in real-time (or near real-time). The system then identifies a set of comparative computing system platform computing aspects (e.g., to compare each computing system platform to) to determine how one computing system platform "measures up" to a standard computing system platform. The system can then determine overall-computing aspect impact level for associated (e.g., corresponding, matching, or otherwise similar) computing aspects of the comparative computing system platform computing aspects. The system can then generate at a GUI, a graphical layout indicating a graphical representation of each computing aspect impact level for each respective computing system platforms' computing aspect of the set of computing aspects to enable users to easily identify that a given computing system platform is secure and safe to use.

In the following description, for the purposes of explanation, numerous specific details are set forth in order to provide a thorough understanding of implantations of the present technology. It will be apparent, however, to one skilled in the art that implementation of the present technology can practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 is a block diagram showing an illustration of components used to determine platform-specific end-to-end security vulnerabilities and a graphical layout for displaying the platform-specific end-to-end security vulnerabilities via a Graphical User Interface (GUI). In various implementations, system 100 can provide a software security label 106. The software security label 106 can display information in a graphical layout that is related to end-to-end software security of a platform-specific software application. For instance, end-to-end software security of a platform-specific software application may refer to the security measures (e.g., networking security mitigation techniques, networking security protection systems, etc.), security vulnerabilities (e.g., security threats, threat vectors, etc.) or other security information of a software application being executed on or with respect to a particular platform. As a software application may be executed on a variety of platforms, where each platform uses a combination of hardware components (and software components installed on the hardware) to host/run the software application, it is advantageous to understand the security of a given software application and whether the software application is safe to use. Logical component 102 can aggregate and analyze data from data sources/sub-models (e.g., agents 104) to generate for display a software security label 106 at a graphical user interface (GUI). Logical component 102 can be one or more of: a data model, a machine learning model, a computer program, or other logical components configured for receiving, transmitting, analyzing, or aggregating application- and/or processing-related data. Logical component 102 can analyze data received from agents 104 and generate a software security label for an end-user (e.g., a user, customer, unskilled user) to convey in an easily understood format whether a software application is safe to use. In some implementations, agents 104 can be a variety of data sources. For example, agents 104 can represent data obtained from one or more third parties (e.g., third-party security entities). Such third-party data sources may represent industry trusted globally accessible knowledge databases of adversary tactics and techniques that are based on real-world observations of security threats of various platforms and computer software. In some implementations, agents 104 can also be one or more machine learning models, deep-learning models, computing algorithms, or other data models configured to output security-related information of a platform and/or computer software. Logical component 102 can analyze data received by agents 104 to generate a graphical representation of end-to-end software security health such that an end-user (or alternatively, a software developer) can easily understand the safety of a software application being executed on a given platform.

Suitable Computing Environments

Figure 2:
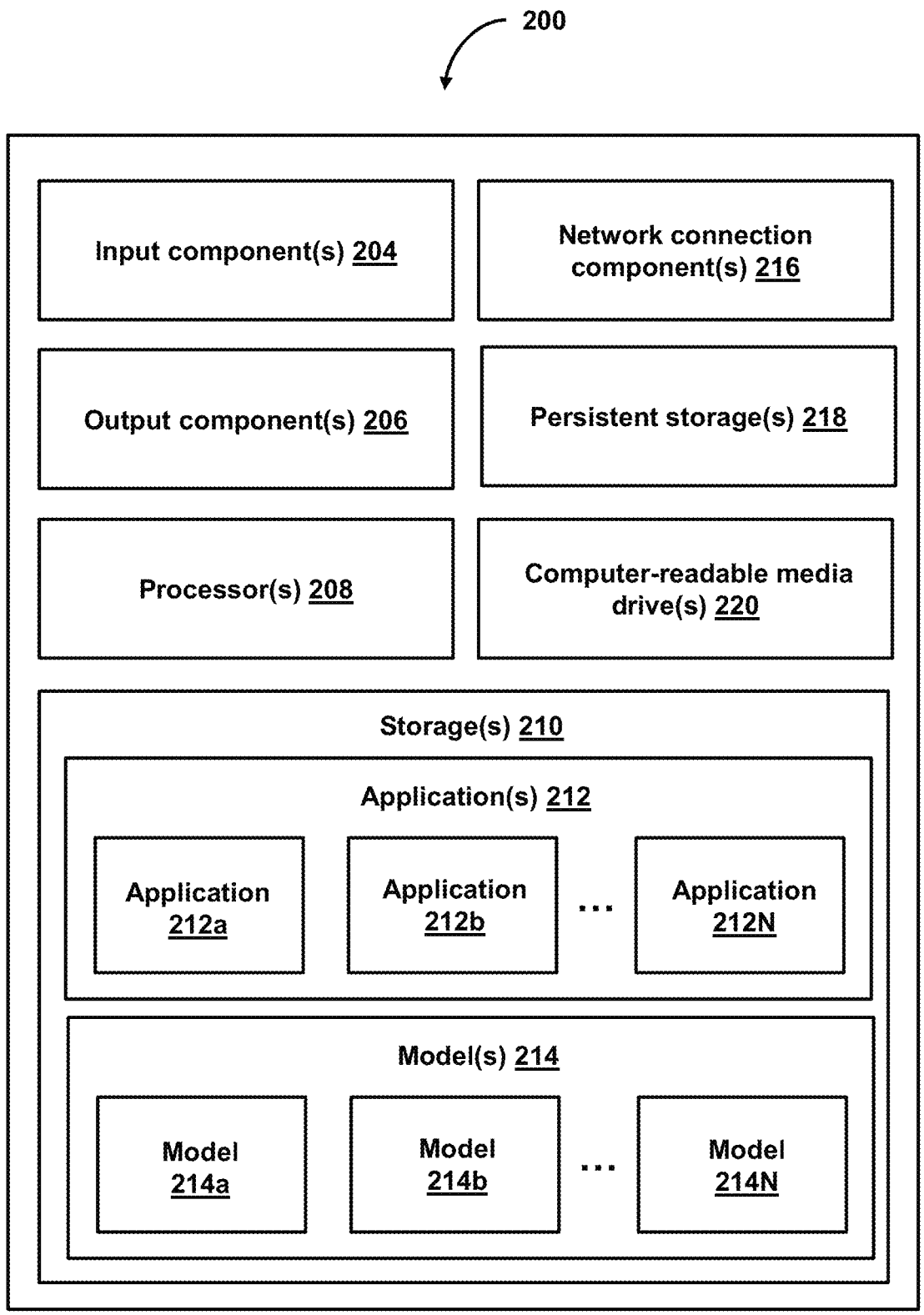
FIG. 2 is a block diagram showing some of the components typically incorporated in at least some of the computer systems and other devices on which the disclosed system operates.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, touch screens, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
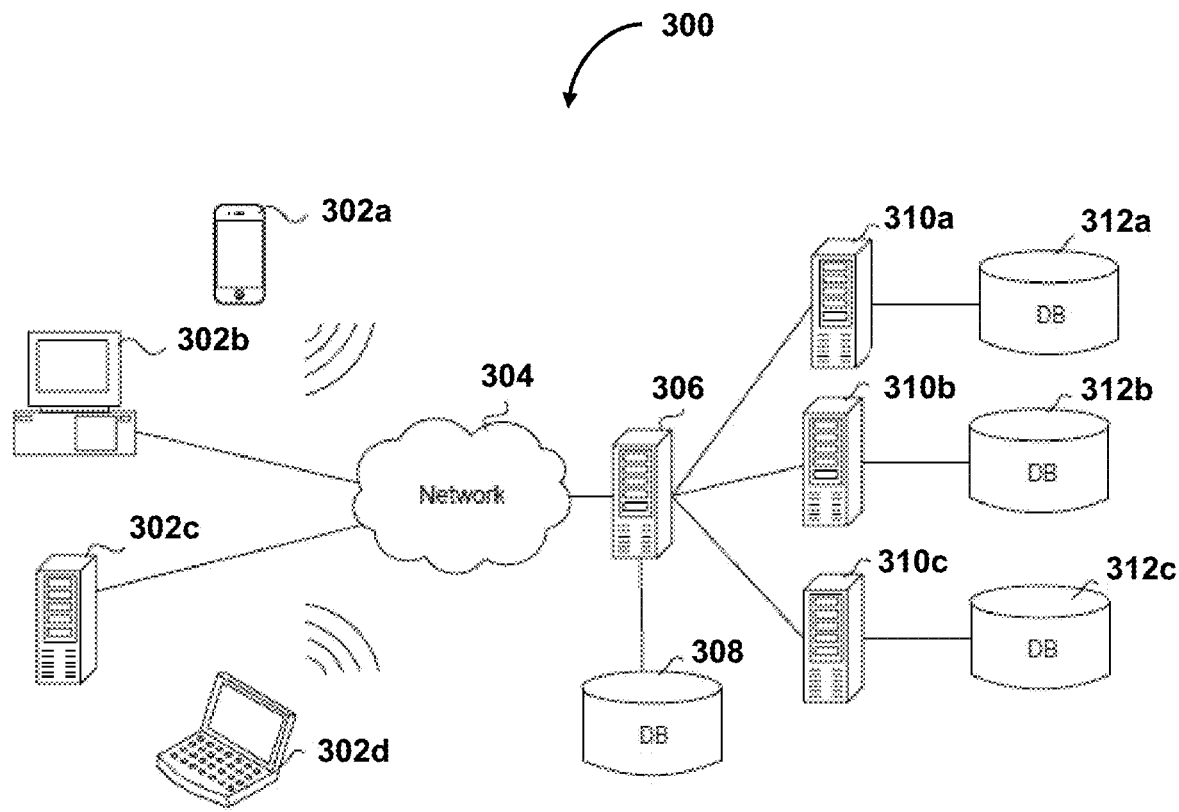
FIG. 3 is a system diagram illustrating an example of a computing environment in which the disclosed system operates in some implementation.

FIG. 3 is a system diagram illustrating an example of a computing environment in which the disclosed system operates in some implementation. In some implementations, environment 300 includes one or more client computing devices 302*a-d*, examples of which can host the system 100. For example, the computing devices 302*a-d* can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310*a-c*. In some implementations, server computing devices 306 and 310 comprise computing systems, such as the system 100. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310*a-c*) connect to a corresponding database (308, 312*a-c*). As discussed above, each server 310 can correspond to a group of servers, and each of these servers can share a database or can have its own database. Databases 308 and 312 warehouse (e.g., store) information such model data, training data, test data, validation data, one or more machine learning models, predefined ranges, predefined thresholds, error thresholds, graphical representations, computing-aspect-mapping structures (e.g., assessment-domain-mapping data structure), data structures, platform identifiers, software application identifiers, security-vulnerability descriptions (e.g., security-vulnerability responses, security threats, security attack vectors, tactics, techniques, and procedures), computing-aspect identifiers (e.g., assessment-domain identifiers), platform-specific policies, mathematical formulas (e.g., weighted average, weighted sum, or other mathematical formulas), graphical elements (e.g., colors, shapes, text, images, multimedia), system protection mechanisms, networking routes, network processing routes, mitigated threat values, mitigated-computing-aspect-impact levels, computing-aspect-specific-impact levels, industry standard scoring standards, predetermined security threat values, received agent 104 information (FIG. 1), or other information.

The one or more machine learning models can include supervised learning models, unsupervised learning models, semi-supervised learning models, and/or reinforcement learning models. Examples of machine learning models suitable for use with the present technology include, but are not limited to: regression algorithms (e.g., ordinary least squares regression, linear regression, logistic regression, stepwise regression, multivariate adaptive regression splines, locally estimated scatterplot smoothing), instance-based algorithms (e.g., k-nearest neighbor, learning vector quantization, self-organizing map, locally weighted learning, support vector machines), regularization algorithms (e.g., ridge regression, least absolute shrinkage and selection operator, elastic net, least-angle regression), decision tree algorithms (e.g., classification and regression trees, Iterative Dichotomiser 3 (ID3), C4.5, C5.0, chi-squared automatic interaction detection, decision stump, M5, conditional decision trees), decision engines, rules engines, Bayesian algorithms (e.g., naïve Bayes, Gaussian naïve Bayes, multinomial naïve Bayes, averaged one-dependence estimators, Bayesian belief networks, Bayesian networks), clustering algorithms (e.g., k-means, k-medians, expectation maximization, hierarchical clustering), association rule learning algorithms (e.g., apriori algorithm, ECLAT algorithm), artificial neural networks (e.g., perceptron, multilayer perceptrons, back-propagation, stochastic gradient descent, Hopfield networks, radial basis function networks), deep learning algorithms (e.g., convolutional neural networks, recurrent neural networks, long short-term memory networks, stacked auto-encoders, deep Boltzmann machines, deep belief networks), dimensionality reduction algorithms (e.g., principle component analysis, principle component regression, partial least squares regression, Sammon mapping, multidimensional scaling, projection pursuit, discriminant analysis), time series forecasting algorithms (e.g., exponential smoothing, autoregressive models, autoregressive with exogenous input (ARX) models, autoregressive moving average (ARMA) models, autoregressive moving average with exogenous inputs (ARMAX) models, autoregressive integrated moving average (ARIMA) models, autoregressive conditional heteroskedasticity (ARCH) models), blackboard machine learning models, and ensemble algorithms (e.g., boosting, bootstrapped aggregation, AdaBoost, blending, stacking, gradient boosting machines, gradient boosted trees, random forest).

In various implementations, the one or more machine learning models can be trained on training data or a training set (discussed in more detail below in relation to FIG. 4). The training data or training set can be created by generating pairs of features (e.g., feature vectors) and/or ground-truth labels/values based on any of the data stored in databases 308 and 312. During training, the machine learning models can be adjusted or modified to fit the models to the training data by, for example, adjusting or modifying model parameters, such as weights and/or biases, so as to minimize some error measure (e.g., a difference between a predicted value and an actual/ground-truth value) over the training data. The error measure can be evaluated using one or more loss functions. Examples of loss functions that can be used include, but are not limited to, cross-entropy loss, log loss, hinge loss, mean square error, quadratic loss, L2 loss, mean absolute loss, L1 loss, Huber loss, smooth mean absolute error, log-cosh loss, or quantile loss. The trained machine learning models can then be applied to test data or validation data (e.g., holdout dataset) to generate predictions (e.g., predicted values or labels). The test data or validation data can also come from data that is stored in databases 308 and 312 (e.g., unlabeled data to generate predictions for). In some implementations, the machine learning models can be retrained to further modify/adjust model parameters and improve model performance. The machine learning models can be retrained on existing and/or new training data, training data, or validation data so as to fine-tune the model parameters to better fit the data and yield a different error measure over the data (e.g., further minimization of the error, or to increase the error to prevent overfitting). More specifically, the model can be further adjusted or modified (e.g., fine-tuned model parameters such as weights and/or biases) so as to alter the yielded error measure. Such retraining can be performed iteratively whenever it is determined that adjustments or modifications to the machine learning models are desirable.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN), but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Machine Learning Model(s)

Figure 4:
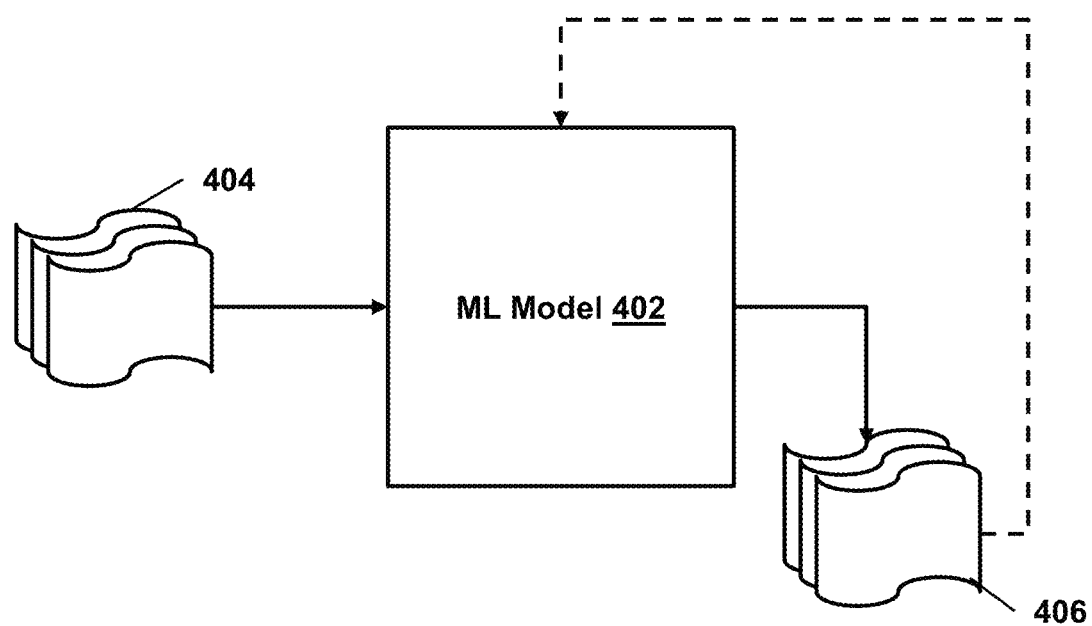
FIG. 4 is an illustrative diagram illustrating a machine learning model, in accordance with some implementations of the present technology.

FIG. 4 is an illustrative diagram illustrating a machine learning model, in accordance with some implementations of the present technology. In some implementations, machine learning model 402 can be part of, or work in conjunction with logical component 102 (FIG. 1). For example, logical component 102 can be a computer program that can use information obtained from machine learning model 402. In other implementations, machine learning model 402 may represent logical component 102, in accordance with some implementations of the present technology.

In some implementations, the machine learning model 402 can include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some implementations, each individual neural unit may have a summation function which combines the values of all its inputs together. In some implementations, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some implementations, neural networks may include multiple layers (e.g., where a signal path traverses from front layers to back layers). In some implementations, back propagation techniques may be utilized by the neural networks, where forward stimulation is used to reset weights on the "front" neural units. In some implementations, stimulation and inhibition for neural networks may be more free flowing, with connections interacting in a more chaotic and complex fashion.

As an example, with respect to FIG. 4, machine learning model 402 can take inputs 404 and provide outputs 406. In one use case, outputs 406 may be fed back to machine learning model 402 as input to train machine learning model 402 (e.g., alone or in conjunction with user indications of the accuracy of outputs 406, labels associated with the inputs, or with other reference feedback information). In another use case, machine learning model 402 may update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 402 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above example recognition objectives.

In some implementations, machine learning model 402 can be trained based on information stored in database 308 or database 312 to generate predictions related to mapping platform identifiers to one or more computing aspects. For example, database 308 may include information related to one or more platform identifiers, software application identifiers, security vulnerability information (e.g., security threats, tactics, techniques, and procedures (TTPs), or other security vulnerability information), security protection mechanisms (e.g., firewalls, encryption standards, hardware security module identifiers, communication protocols, system security policy information, or other security protection measure-related information), computing aspect identifiers (e.g., assessment-domain information, etc.) or other information. As an example, machine learning model 402 may be trained on one or more predetermined computing-aspect-mapping structures such that, when new information is provided to the machine learning model as inputs, machine learning model 402 may generate an updated or "new" computing-aspect-mapping structure that indicates a mapping of platforms to computing aspects involved with a processing of network operations. For instance, the computing-aspect-mapping structure can represent a data structure that maps platform identifiers (e.g., a cloud-based platform, a mobile application platform, third-party hosted platform, or other ecosystem of computing resources) to one or more computing-aspects (e.g., assessment domains). For example, the computing-aspect mapping structure may can be a table, graph, directed graph, array, or other data structure configured to include information related to platforms, security vulnerability descriptions, computing aspects, or other information. For instance, the computing-aspect-mapping structure may map platform identifiers to one or more computing aspects involved with a processing of network operations.

Computing-aspects may refer to any aspect of a computing system that is involved in a processing of data. For instance, a computing-aspect may be data storage, cryptography, platform usage, network, remote attestation, or other computing-aspect that is involved during the use of a software application being executed on a platform. Such computing-aspect-mapping structure can be generated to determine which computing aspects are involved with a given platform/software combination. As every software application is executed on a given platform, such as a cloud-based platform, each platform may be associated with a set of hardware and software that forms the "base layer" for a software application (e.g., as developed by one or more software developers) to be executed "on-top" of. Therefore, to accurately determine whether a software application is "safe" to use, it is important to determine which computing aspects are related to a particular platform and how the hardware/software combinations of that particular platform may impact the overall security of the software application being executed on the platform. As such, in some implementations, machine learning model 402 may be configured to generate a computing-aspect-mapping structure that may map one or more platform identifiers to one or more computing-aspects involved with a processing of data (e.g., execution of a software application) to determine a computing-aspect impact level (or assessment-domain impact level) for each computing-aspect associated with the platform.

For example, machine learning model 402 can take a first set of information as input 404. The first set of information can include platform identifiers, security vulnerability descriptions, one or more computing aspects, or other information. For example, the platform identifiers may indicate a respective platform that a software application is associated with (e.g., cloud-based application, mobile application, operating system), an identifier identifying an ecosystem of computing resources associated with the software application, or other platform identifier. The security vulnerability descriptions may indicate security vulnerability information, security threats, security attack vectors, TTPs, or other security vulnerability-related information. In some implementations, the security vulnerability descriptions may be obtained from one or more third-party security entities (e.g., a computing security related entity that provides computing threat related information, such as Mitre® or NIST®). Additionally, the one or more computing aspects may indicate predetermined categories that are related to one or more computing related aspects that are involved with a processing of network operations. As an example, the computing aspects may indicate assessment-domains, indicating a category of a process, procedure, or usage of computing function when data is processed by a computer. For instance, an assessment domain may indicate a "platform usage," "data storage," "network," "cryptography," "remote attestation," or other assessment domain. Such assessment domains may be a predetermined label to an aspect of computer functionalities related to processing network operations.

Machine learning model 402 can take the first set of information as input 404 and generate a computing-aspect-mapping structure as output 406. the computing-aspect-mapping structure may indicate a mapping of computing aspects mapped to one or more platform identifiers. For instance, prior to generating a computing-aspect impact level for each computing aspect associated with a given platform and the software application being executed on the platform, it is advantageous to determine which computing aspects are involved with the given platform. In this way, the system can later use the security vulnerability descriptions to determine how "big" or "how important" a given threat is to a specific computing aspect. Machine learning model 402 can use the security vulnerability descriptions and the platform identifiers to learn associations between the security vulnerability descriptions and the platform identifiers with respect to the predetermined computing aspects to correctly map a security vulnerability to a platform identifier. In some implementations, output 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, a predetermined computing-aspect mapping, or other information).

In some implementations, machine learning model 402 can be trained based on information stored in database 308 or database 312 to generate predictions related determining threat values. As an example, a threat value may be any value indicating a level of a threat. For instance, a threat value may indicate a level of risk associated with a given security vulnerability, security vulnerability description, or other security vulnerability information. Machine learning model 402 can take a second set of information as input 404. The second set of information can include platform identifiers, security vulnerability descriptions, one or more computing aspects, a platform-specific policy, or other information. As an example, the platform-specific policy can indicate security impact information related to security-vulnerability descriptions. For instance, the platform-specific policy can indicate threat-aspects (e.g., threat information included in the security vulnerability descriptions) that are deemed significant to a given entity. The entity may be a service provider, company, corporation, merchant, or other entity. The entity may have a set of rules, procedures, or other guidelines/policies for handling security threats and/or security vulnerabilities that are important to the operation of one or more computing systems related to the entity as well as one or more computing aspects that are important to the one or more computing systems. As such, the platform-specific policy may act as a governing document for a particular computing platform of the entity that is associated with the handling of one or more threats, threat values, or threat mitigation values. In some implementations, the platform-specific policy may include one or more values that are assigned to security vulnerabilities and the respective computing aspects that are associated with the one or more values. As such, machine learning model 402 may use the platform-specific policy to determine or otherwise generate a threat value indicating a "threat level" (e.g., an impact of a security-vulnerability) that is specific to the entity, the associated computing platform of the entity, and the computing aspects associated with the computing platform of the entity. As an example, the entity may include various computing platforms to provide one or more services to an end-user. The entity may "care" more about a particular security vulnerability related to cryptography in a cloud-based platform/environment as opposed to the same vulnerability in a mobile application-based platform/environment. As such, the policy may indicate to give a "higher weight" to the threat value of the security vulnerability related to cryptography in the cloud-based platform/environment and give a lover weight to the same vulnerability in the mobile application-based platform/environment. In some implementations, the threat value may be a quantitative value, such as an integer, percentage, ratio, decimal value, or other quantitative value. In some implementations, the threat value may be a qualitative value, such as "high," "medium," "low," "yes," "no," or other qualitative value.

Machine learning model 402 can take the second set of information as input 404 and generate a threat value of each security vulnerability description as output 406. For instance, the machine learning model 402 can use the platform-specific policy to determine a threat value for each security vulnerability description with respect to each computing aspect of the entity's computing system by learning associations between a platform identifier, the information included in security vulnerability descriptions, the information included in the platform-specific policy, and the one or more computing aspects. In this way, the system may later use the threat values of each security vulnerability descriptions to determine how "big" or "how important" a given threat is to a specific computing aspect that is specific to the computing platform/environment of the entity. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined threat values, or other information).

In some implementations, machine learning model 402 can be trained based on information stored in database 308 or database 312 to generate predictions related determining computing aspect impact levels (e.g., assessment-domain impact levels). For example, machine learning model 402 can take a third set of information as input 404. The third set of information can include platform identifiers, security vulnerability descriptions, one or more computing aspects, a platform-specific policy, one or more impact level measures, or other information. As an example, the one or more impact level measures may indicate how to "measure" or otherwise "generate" a computing aspect impact level. For instance, the impact level measures may indicate one or more algorithms, weights, ratios, values, or mathematical formulas to serve as a basis for generating a normalized impact level. In some implementations, a computing aspect level may be a quantitative value, such as an integer, percentage, ratio, decimal value, or other quantitative value. In some implementations, the computing aspect level may be a qualitative value, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the third set of information as input 404 and generate a computing aspect impact level for each computing aspect of a set of computing aspect as output 406. For instance, the machine learning model 402 can use the impact level measures by learning associations between a platform identifier, the information included in security vulnerability descriptions, the information included in the platform-specific policy, the one or more computing aspects, and the impact level measures. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is at an acceptable risk for use. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related determining mitigated-computing-aspect impact levels (e.g., mitigated-assessment-domain impact levels). For example, machine learning model 402 can take a fourth set of information as input 404. The fourth set of information can include platform identifiers, security vulnerability descriptions, one or more computing aspects, a platform-specific policy, one or more impact level measures, system protection measure information, mitigated threat values, or other information. As an example, the one or more system protection measure information can indicate information related to a protection system associated with a given platform and software being executed on the platform with respect to an entity. For instance, an entity may employ one or more computing system protection measures to mitigate one or more computing-related threats, attacks, or other computing/network related threats. Such protection measures can include, but are not limited to firewalls, cryptographic communication standards, hardware security modules, honeypots, intrusion detection systems, scareware, proxy servers, software updates, hardware updates, or other cybersecurity related software/hardware protection measures. In some implementations, the system protection measures can be specific to a given platform (e.g., via a platform identifier). For instance, in a cloud-based platform/environment, the entity may employ one or more proxy servers whereas in a mobile-application based platform/environment, a hardware security module may be employed. It should be noted that any combination may exist, and such examples are merely exemplary. In some implementations, each system protection measure may be assigned a predetermined mitigated-threat-value. For example, each system protection measure may be assigned an "offset" value configured to "offset" a threat level of a security vulnerability. For instance, where a known security vulnerability of a cryptographic communication attack vector is known in a cloud-based environment, where an entity is employing a firewall, the threat value associated with the cryptographic communication attack vector may be mitigated. As such, the system may assign the threat value to the mitigated threat value to "lower" the impact level/threat level as the security vulnerability has been mitigated by the firewall. That is, the mitigated threat value level may be lower than that of the threat level currently assigned to the security vulnerability (e.g., as the entity is employing a firewall that has an effect on the attack vector). In some implementations, the mitigated threat value and the mitigated-computing-aspect-impact level may be quantitative values, such as an integer, percentage, ratio, decimal value, or other quantitative value. In some implementations, the mitigated threat value and the mitigated-computing-aspect-impact level may be a qualitative values, such as "high," "medium," "low," "yes," "no," or other qualitative value. As such, machine learning model 402 may use the impact level measure to determine a normalized quantitative or qualitative value for indicating a level of impact with respect to one or more computing aspects.

Machine learning model 402 can take the fourth set of information as input 404 and generate a mitigated threat value and/or mitigated-computing-aspect impact level for each computing aspect of a set of computing aspect, with respect to a security vulnerability as output 406. For instance, the machine learning model 402 may use the system protection measures by learning associations between a platform identifier, the information included in security vulnerability descriptions, the information included in the platform-specific policy, the one or more computing aspects, and the impact level measures, the system protection measures, or other information. In this way, the system may later use the mitigated threat values and the mitigated-computing-aspect impact levels to generate an easily understood graphical representation of mitigated-computing-aspect-impact levels. By doing so, end-users, as well as software developers, may easily view a software security label to understand whether an entity is mitigating any known security vulnerabilities, thereby improving the user experience and increasing user trust. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigated-computing-aspect-impact levels, predetermined mitigated threat values, or other information).

In some implementations, machine learning model 402 can be a blackboard machine learning model. A blackboard machine learning model can represent a blackboard architectural model where a common knowledge base (e.g., the "blackboard") is updated by differing data sources (e.g., agents 104 (FIG. 1)). For instance, the blackboard machine learning model may be configured with a first problem (e.g., generate computing aspect impact levels for a set of computing aspects associated with a platform for a software application). The blackboard machine learning model may use information supplied by the data sources (e.g., one or more agents, interactive agents, interactive models, artificial intelligence models, machine learning models, etc.) to update the blackboard machine learning model with one or more partial solutions. In some implementations, the data sources may "publish" information to the blackboard machine learning model. When publishing information to the blackboard machine learning model, an agent or other data source may obtain information associated with the blackboard machine learning model (e.g., historical information uploaded to the blackboard machine learning model, relevant information associated with the agent, prior partial solutions, etc.) and may update the blackboard machine learning model with new information. As such, the data sources and the blackboard machine learning model work together to solve the first problem. In some implementations, where machine learning model 402 is a blackboard machine learning model, machine learning model 402 may take a fifth set of information as input 404 and generate a computing aspect impact level for each computing aspect of a set of computing aspect as output 406.

As an example, the fifth set of information may include platform identifiers, security vulnerability descriptions, one or more computing aspects, a platform-specific policy, one or more impact level measures, or other information obtained from agents 104 (FIG. 1). For instance, the machine learning model 402 may use the input information (e.g., input 404) to learn associations between the input information (e.g., thereby generating partial solutions), and may also iteratively update the blackboard model based on new input information to generate outputs 406 indicating computing aspect impact levels for each computing aspect of a set of computing aspects associated with the platform. In this way, the system may later use the impact level for each computing aspect of the set of computing aspect that is specific to the computing platform/environment of the entity to generate an easily understood graphical representation of such. By doing so, end-users, as well as software developers, may easily view a software security label to understand whether a software application is safe to use. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined computing aspect impact levels, or other information).

In some implementations, machine learning model 402 can be trained based on information stored in database 308 or database 312 to generate predictions related to generating a set of impacted computing-aspects (e.g., impacted assessment-domains). For example, machine learning model 402 can take a sixth set of information as input 404. The sixth set of information can include platform identifiers, security vulnerability descriptions, one or more computing aspects, one or more impact level measures, set of labeled feature vectors, computing system component identifiers, impacted-computing aspects, or other information. For example, the set of labeled feature vectors may indicate labels of (i) a given security vulnerability, (ii) a given computing system component, and/or (iii) a given impacted computing-aspect. Each feature vector of the set of labeled feature vectors may include a labeled security vulnerability, a labeled computing system component (e.g., identifying information of hardware or software associated with the computing system component), and labeled impacted computing-aspect such that each of the labels correspond to (or are otherwise associated with) one another. The feature vectors may be based on historically derived information indicating which security vulnerabilities affected a given computing system component, and which computing aspect (e.g., of a computing system/platform) was impacted by such. Leveraging this unique and robust training data, machine learning model 402 may be trained to generate accurate predictions determining a set of impacted computing-aspects.

Machine learning model 402 can take the sixth set of information as input 404 and generate a set of impacted computing-aspects as output 406. For instance, the machine learning model 402 may use the sixth set of information to learn associations between security vulnerabilities, computing system components, and impacted computing-aspects to generate a set of impacted computing-aspects when provided a set of security vulnerabilities. In this way, the system may later use generated set of impacted computing-aspects to generate an easily understood graphical representation of impacted computing-aspects, enabling users to quickly identify which aspects of a given computing-system is at risk of a security exploit. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined impacted-computing aspects, or other information).

In some implementations, machine learning model 402 can be trained based on information stored in database 308 or database 312 to generate predictions related generating a set of security mitigation actions. For example, machine learning model 402 can take a seventh set of information as input 404. The seventh set of information can include platform identifiers, security vulnerability descriptions, one or more computing aspects, a platform-specific policy, one or more impact level measures, system protection measure information, mitigated threat values, a second set of labeled feature vectors, or other information. For example, the second set of labeled feature vectors may indicate labels of (i) a given impacted computing-aspect, (ii) a given security vulnerability, and (iii) a given security mitigation action. Each feature vector of the set of labeled feature vectors may include a labeled impacted computing-aspect, a labeled security vulnerability (e.g., security vulnerability descriptions, security vulnerability responses, etc.), and labeled security mitigation action such that each of the labels correspond (or are otherwise associated with) one another. The feature vectors may be based on historically derived information indicating which security vulnerabilities affected a given computing-aspect, and which mitigation actions resolved the computing-aspect's security vulnerability.

The mitigation action may be an action that resolves or inhibits a security exploit related to the security vulnerability. In some implementations, mitigation action(s) may be based on a platform-specific policy that is described later. For example, mitigation action(s) for a platform usage computing-aspect may be "Ensure application detects Root or Jailbreak device and informs/restricts on app launch; Ensure only latest software version supported for app so as to leverage the native benefits and its security updates; ensure on latest software versions supported to align with OS security patches," or other information such as "install software version X.XX." Mitigation action(s) for a data storage computing-aspect may be "Do not store any sensitive data in clear on local device especially under external storage; Ensure application detects Root or Jailbreak device and informs/restricts on app launch; If sensitive data needs to be stored on client, then ensure encrypted storage is implemented; Avoid writing data on external storage due to global accessibility; Use clearCache to delete any sensitive data stored through webview; Explicitly mark allowBackup, debuggable as false," or other mitigation actions. Mitigation action(s) for a cryptography computing-aspect may be "Ensure application uses only entity approved encryption/signing/hashing methods; Only standard and approved protocols should be used to exchange symmetric keys between client app and server for secure communication; Ensure signature generation on client should leverage SE/TEE only; Ensure app does not rely on symmetric cryptography with hardcoded keys as sole method of encryption; Ensure app does not re-use the same cryptographic key for multiple purposes; All random values generated using a secure random number generator," or other mitigation actions. Mitigation actions for a computing-aspect of network communication may be "enforce HTTPS (TLS) for connections for any domain; Enforce application encryption on top of TLS; App checks invalid certificate and should not be allowed to continue despite a certificate error; Implement whitelisting of domains at app and validation at server; Ensure only entity recommended ciphers are configured; Implement certificate pinning and validation at network change; Implement Certification revocation list checks within app," or other mitigation actions. Mitigation action(s) for a computing-aspect of client code integration may be "ensure no application or third-party library or code are downloaded into application at run time; all dependent SDKs, Frameworks, Libraries should be embedded into application before packaging," or other mitigation actions. It should be noted, that not all computing-aspects (e.g., assessment-domains) and mitigation actions for determined security vulnerabilities are disclosed; others exists and those listed above are illustrative.

Machine learning model 402 can take the seventh set of information as input 404 and generate a set of mitigation actions as output 406. For instance, the machine learning model 402 may use the seventh set of information to learn associations between security vulnerabilities, computing system components, impacted computing-aspects, and mitigation actions to generate a set of mitigation actions when provided a set of impacted computing-aspects and a set of security vulnerabilities impacting the respective impacted computing-aspects. In this way, the system may later use generated set of mitigation actions to enable a user to quickly correct security vulnerabilities impacting a given computing system. Additionally or alternatively, the system may later use generated set of mitigation actions to configure a network component to automatically apply one or more mitigation actions to correct security vulnerabilities impacting the computing system/platform, thereby increasing networking and computing security. In some implementations, outputs 406 may be fed back into machine learning model 402 to update one or more configurations (e.g., weights, biases, or other parameters) based on its assessment of its prediction (e.g., outputs 406) and reference feedback information (e.g., user indication of accuracy, reference labels, ground truth information, predetermined mitigation actions, etc.).

Attack and Mitigation Synthesis

The approaches described herein can be used to synthesize an attack using one or more known vulnerabilities by analyzing systems and/or infrastructure to determine where there may be exposure to a vulnerability. The disclosed techniques can be used to generate patches or other mitigations. The disclosed techniques can be used to determine paths through which an exposure can be exploited and can also be used to analyze security controls in an exploit path. The disclosed techniques can provide automatic testing prior to patching, automatic testing after patching, validation after patching production systems, etc. the techniques can also be used to create patches, deployment scripts, etc. These various functions are described in more detail herein.

In some implementations, an LLM can be used to generate an exploit based on one known vulnerability or more than one known vulnerability. Vulnerabilities information and/or other security information can be pulled from various third-party sources. In some implementations, the LLM ingests CVE data and/or other data, and the LLM can use this information to generate an exploit for the vulnerability. The generated exploit can be deployed to evaluate the effects of the vulnerability, assess which systems are impacted by the vulnerability, and so forth. In some implementations, a system uses retrieval augmented generation (RAG) with an LLM to enhance to quality and/or relevancy of the outputs of the LLM. For example, RAG can be used to provide the LLM with information about APIs, libraries, system configurations, previous successful exploits, and so forth (generally referred to as "supporting information" herein).

RAG can involve a two-step process. In a retrieval step, a system can retrieve relevant supporting information from a larger source of data. The retrieval can be carried out using a retrieval model. The retrieval model can utilize dense vector representations to identify portions of data that are relevant to a particular query. In a generation step, the retrieved information can be used as an input or context for an LLM. The LLM can use the retrieved information along with the initial input context to generate an output, which can be, for example, an exploit, patch, etc. A system can be configured to use retrieved information as part of the input or can be used in a multi-prompt configuration to guide the generation process. The use of RAG can enable an LLM to provide outputs that are more accurate, more relevant to a given context, etc.

Various refinement techniques can be used to improve the use of RAG and/or the performance of an LLM. Various prompt engineering approaches can be used additionally or alternatively. Refinement techniques can include, for example, multiple chunking approaches, metadata-based ranking, PEFT LoRA, etc. In some implementations, the approaches herein utilize prompt engineering techniques such as chain of thought, personae, and/or multi-prompting to improve performance and/or to generate longer, more complex, more nuanced, and/or more specific outputs. For example, personae can be used to cause the LLM to respond in a particular manner, such as providing responses consistent with what an attacker would do. Chain of thought can be used to break down a complex problem into smaller pieces, generating intermediate outputs that can be refined as needed. Multi-prompting can be used to explore different dimensions of a problem. For example, in the context of generating an exploit, multi-prompting can be used to determine various aspects of the exploit, such as how to access a system, code or inputs to supply to a system to exploit a vulnerability, etc.

As described herein, the disclosed techniques can be used to synthesize code to exploit a known issue. Some LLMs are suitable for generating code in one or more programming languages. For example, the techniques herein can be used to generate code in Java, C, C++, C#, Swift, Python, Ruby, JavaScript, TypeScript, shell scripting languages (e.g., for bash, tcsh, csh, zsh, PowerShell, etc.), or any other language.

In some implementations, a generated exploit may not include executable code. For example, in some implementations, the techniques described herein can be used to generate instructions that guide a user in exploiting a vulnerability. In some implementations, the techniques herein can generate pseudocode that a human can use to create an exploit. Such functionality can be advantageous when, for example, the LLM has not been sufficiently trained on a particular programming language or particular library or libraries to generate executable code for carrying out an exploit. For example, an LLM may struggle to generate code in less common languages such as Haskell or Lua. In some implementations, a generated exploit can comprise a vector or set of vectors, which can, in some implementations, be used by another model to further develop an exploit.

While LLMs can be well-suited to generating code, there can be limitations with currently available models. For example, current LLM technology is typically limited to generating small snippets of code to perform specific functions or discrete tasks. Thus, to use LLMs to generate vulnerability exploits, which can be complex, it can be important to recognize and address this limitation.

In some implementations, the techniques herein can provide an application or API that accesses a CVE or other source data, and an LLM can use the provided source data and retrieval augmented generation to determine the parts (e.g., features) of the source data (e.g., parts of a CVE) that are relevant to exploiting the vulnerability (e.g., affected software, affected version, affected file, type of vulnerability (e.g., buffer overflow, SQL injection, privilege escalation, etc.), attack vector (e.g., network, adjacent network, local, physical), required privileges, whether or not user interaction is required, etc.). In some implementations, information can be split based on whether it is aligned to the creation of an attack, including for example the language to use, the nature of the exposure, an expected fix, etc.

In some implementations, to generate an exploit, a system can create a set of components, which can include, for example, a single exploit function or a combination of functions. The exploit function(s) can have one or more required data elements in some implementations. The system can generate or utilize an existing attack harness to execute the exploit function. In some implementations, executing the exploit function can include executing the exploit function multiple times using different values for one or more data elements. In some implementations, the system can generate or utilize a data set corresponding to the attack. The data set can, in some implementations, be generated by leveraging variational autoencoders (VAEs) to modify parameters. Variational autoencoders are a type of generative model that can be used to generate new data samples by capturing the underlying distribution of training data. In a VAE, an encoder network can map input data to a latent space. The encoder network can learn to encode input data in a mean and variance vector. A decoder network can take a sample from the latent space and reconstruct the original input data. The decoder network can learn to generate outputs that are similar to the training data. The use of VAEs can help to generate data that can be used as data elements for an exploit function. Advantageously, this generated data can be similar to training data so that the generated data has a higher likelihood of being a useful input to the attack function, as opposed to, for example, being irrelevant or inapplicable data.

In some implementations, exploit function data elements can include, for example, usernames, passwords, IP addresses, domain names, strings (e.g., strings of varying lengths for testing buffer overflow vulnerabilities), or any other data that can be used in exploiting a vulnerability. In some implementations, data element values can be based on known information such as the usernames of users or administrators, IP addresses of servers, names of servers, Active Directory domain names, etc.

An LLM can be trained to generate exploits, for example by training the LLM using previous exploits, though this is not necessary and, in some cases, an LLM may not be specifically trained for security applications. In some implementations, the retrieval augmented generation can be used to provide the LLM with information that can be used in generating exploits, such as examples of previous exploits, exploit functions, snippets of exploit functions, etc. Code for previous exploits can be valuable when generating new exploits, as exploits can tend to be similar to previous exploits or can share common features with previous exploits.

As described herein, current AI technology may not be sufficient to create an attack without breaking the task down into smaller pieces. LLMs typically have a maximum token limit, which can restrict the length of generated output. The token limit can vary depending upon the specific LLM, available resources, configuration settings, etc. To generate a larger amount of code, it can be beneficial to split a code generation task into smaller segments or chunks. In some implementations, the outputs of each segment of the code generation task can be combined to generate a final output. In some implementations, prompt engineering can be used to guide an LLM when generating code. For example, by providing specific instructions or context in a prompt, the LLM can be caused to generate code that aligns with various requirements. It will be appreciated that the need to break down code generation tasks can wane over time as models improve and/or as computer hardware improves and can more easily handle the generation of large outputs, and so forth. Moreover, while exploits are often complex, this is not necessarily the case. Thus, in some cases, a system may utilize an LLM to synthesize an exploit without breaking the code generation into multiple pieces.

To generate code, a system can be configured to utilize a set of pre-made code snippets to construct a larger set of code to implement an attack. For example, if an attack is API-based, a system can utilize a stubbed API as part of the prompt. In some implementations, the prompt can include a field name, attack target, access information, etc., as data elements.

An organization, individual, etc., can use the techniques described herein to conduct vulnerability testing on their own systems. However, as described herein, there can be many systems involved, including systems not controlled by the organization or individual. For example, during an interaction between a company and a customer, there can be company systems, cloud provider systems (over which the company may have some level of control), customer systems (e.g., a smartphone, desktop, laptop, tablet, etc.), networking hardware (e.g., Wi-Fi routers, ethernet routers, switches, load balancers, cellular communications hardware, etc.) involved. Thus, it can be significant to generate exploits that can test a wide range of systems. However, when testing systems that are outside the organization's direct control, it can be important to ensure that synthesized attacks do not have negative effects on such systems.

As an example of testing from the perspective of an end user device, the approaches herein can be used to test exploits for vulnerabilities that affect, for example, outdated applications, outdated system software, insecure network connections, and so forth. From a company perspective, the approaches herein can be used for vulnerability testing of, for example, server software (e.g., unpatched or otherwise outdated server software), misconfigurations, etc.

The results of vulnerability testing can be used to identify one or more mitigation actions (e.g., fixing, avoidance, or deflecting) that can be taken. Mitigation actions can include, for example, applying a software patch, changing a software configuration, rerouting network traffic to avoid affected systems, or implementing deflection capabilities, such as identifying nefarious network traffic and routing it to non-production systems. As one example, if there is a vulnerability affecting systems from a first cloud services provider, actions can be redirected to a second cloud services provider that is not affected by the vulnerability.

In some implementations, vulnerability testing is used to rank vulnerabilities. As described herein, there are a large number of vulnerabilities, and testing and patching them can consume significant resources. Thus, there can be a need to prioritize response actions. In some implementations, vulnerability ranking is determined automatically, for example based upon an identification of which systems are vulnerable, the possible fallout from exploitation (e.g., a system being taken offline may be less impactful than customer data being stolen), etc. Ranking can be carried out at a vulnerability level, a system level (e.g., prioritizing patching systems that contain or have access to sensitive information or that are critical to operations over systems that are less critical or that do not have access to sensitive information), or both. In some implementations, ranking includes the use of CVSS scores.

In some implementations, a system can build a test harness. A test harness can be a framework or set of tools or scripts that facilitates automated vulnerability testing. The test harness can include, for example, test cases, test scripts, and so forth. In some implementations, a test harness can include data retrieval, logging, and/or reporting functionality. In some implementations, the test harness includes analysis capabilities. As with generating a vulnerability, the test harness can, in some cases, be constructed in pieces using an LLM, for example with a loop and single exploit executor built separately from a data importer and, optionally, error handling logic. The particular features included in a test harness can vary from implementation to implementation. In some implementations, a system or user specifies as part of an LLM prompt what functionality to include in the test harness.

In some implementations, deployment targets can be built on open source and/or public cloud infrastructure. In some implementations, deployment targets can be built for on-premises execution. Generated attacks can be configured to target different operating systems, servers, etc.

In some implementations, a library of components is built and provided to RAG data sources. Components can be vectorized and applied based on best fit logic. In some implementations, the best fit logic is refined during training, for example using Parameter-Efficient Fine-Tuning Low-rank Adaption (PEFT LoRA) techniques to improve matching. Over time, the library can grow to support multiple attack approaches, operating systems, languages (which can include bytecode), recovery techniques, deployment targets (which can include techniques such as JiBX), and attack targets.

A data set containing data passed to an exploit function can be self-describing, for example with column headers aligned to field names used in the attack function code. In some implementations, initial data sets are prepared by, for example, extracting information from CVE data, from knowledge data describing systems or networks, from other data sources, and/or by hand. In some implementations, a data set can be extended using VAEs. As described herein, a VAE can be useful in such scenarios because VAEs can be used to generate data that is similar to data used to train the VAE. In some implementations, validity of the data set can be checked using a generative adversarial network (GAN). For example, a GAN can be used to compare generated data to real data to determine similarity between the generated data and the real data. VAEs generally are trained such that they generate data that follows a distribution in a learned latent space. There may be greater variation in data generated using a VAE than data generated using a GAN, since GANs are typically trained to generate outputs that closely resemble training data. VAE-generated data can be useful for exploring a latent vector space, while GANs can be useful for ensuring that the data generated by a VAE is realistic (e.g., that the VAE-generated data closely resembles training data).

A results output can depend on how and/or where an exploit function is run. For example, a generated exploit or harness may write to standard output (stdout) and/or to a filesystem for persistent storage. In some implementations, an output subsystem is configured to handle output of the generated attack, for example to handle tasks such as writing to disk, writing to a database, etc.

A generated exploit can be run against all systems. However, such an approach can be inefficient as only a small number of systems may even potentially be susceptible to a particular vulnerability. For example, there may be no reason or benefit to test an exploit against a web server application on a system that doesn't run any web server software. Thus, it can be significant to determine where exposures may exist.

In some implementations, various information about systems can be used to determine where exposures may exist. For example, system information can include information about operating systems (e.g., operating system version, kernel version, etc.), installed patches, patch versions, third party libraries, library versions, installed software, software versions, etc. In some implementations, system configuration information can be used as a data source for a RAG subsystem.

Using system information in combination with CVE information can enable identification of potentially vulnerable systems. However, it can be difficult to know which systems are potentially vulnerable even when some system information is available. For example, in many cases, modern software-including web applications—is built on a plethora of third party libraries or frameworks, which themselves may depend on other third party libraries or frameworks, which may have their own dependencies. Determining a complete, accurate listing of software, libraries, frameworks, etc., that are in use on a system can be a difficult task as it may not always be clear what code is being used. This can be especially true in cases where code is not stored locally but is instead pulled from an external repository. Thus, in some implementations, vulnerability testing is conducted on systems even when it is not apparent that those systems are potentially vulnerable or have affected software installed.

It will be appreciated that even if a system does have vulnerable software installed or is running hardware with a vulnerability, this does not necessarily mean that the system is actually exploitable. For example, as described herein, CVE information may fail to identify specific version dependencies, configuration dependencies, etc. Moreover, even an unpatched system may not actually be exploitable. For example, if a system does not have unnecessary services enabled, has implemented strict access controls, etc., it may be harder to exploit a vulnerability on an unpatched system. Similarly, the presence of firewalls, endpoint detection and response (EDR) or extended detection and response (XDR) software, and so forth can prevent exploitation and/or reduce the potential damage caused if a system is exploited. For example, EDR and XDR software can, in some cases, be configured to automatically take actions when malicious activity is detected. Such mitigation actions can include, for example, disabling network access, stopping services, etc. In some implementations, patches can be generated that configure EDR or XDR software to detect and/or take mitigation actions when an attempt to exploit a vulnerability occurs.

In some implementations, once a system is identified as exposed or potentially susceptible to a vulnerability, it can be significant to identify potential exploitation paths that can be used to exploit the exposure. In some implementations, a RAG subsystem can be used in determining attack paths that can be taken. Paths can be influenced based on, for example, network configuration, how an exploit is connected to other software, where an attack originates from (e.g., within an organization's network or externally, such as over the internet), etc. For example, in a standalone system with no connections to other systems, an attack can be sourced only from software or hardware locations in the systems, such as a vulnerable library, and may only be executed by individuals with local access to the system. In today's highly interconnected world, systems are frequently connected to a network, which can present a path for exploitation of an exposure.

In some implementations, a path comprises an ordered set of steps taken to gain access to a vulnerable system. For example, a path could include steps such as "access login page location at https:// . . . ; enter credentials; access stored payments page; click update payment information, . . . " This is merely an example, and it will be appreciated that there can be various paths which may involve accessing web pages, manipulating URLs, connecting to servers or other systems via protocols such as telnet, ssh, ftp, or sftp, and so forth. Some paths can involve connecting over specific networks, such as Wi-Fi networks that utilize specific networking hardware, cellular networks in specific locations or operated by specific providers, etc.

Once attack paths are established, the techniques herein can analyze security controls that are in place. For example, a security controls RAG source can be used as part of a multi-prompt workflow. Security controls can include, for example and without limitation, firewalls, intrusion detection systems, network access controls, endpoint protection software, network monitoring software, access control lists, file permissions, database permissions, remote connection permissions, etc. This information can be used to determine if an attack can be exploited or if controls in place are insufficient to prevent a particular type of attack. Regardless, in some implementations, the techniques herein can be used to attempt an attack. In some implementations, attacks can be attempted in a low-risk manner, for example in a manner that does not risk compromising normal operation of production systems. For example, attacks may be attempted in a test or development environment, rather than in a production environment, although in some cases, such testing may not be possible. For example, when conducting testing that employs user devices, networking infrastructure outside an organization's control, etc., it may not be possible to configure a test environment that is suitable for evaluating attacks.

Once attack paths are established, an application can deploy an exploit, which can include a single generated exploit or multiple generated exploits, an attack harness, data, and a results target. Depending upon where the software is executed, there may or may not be an ability to automatically deploy the software. For example, if an exploit is executed from a remote source, the attack can be deployed to a public cloud instance, such as Amazon Web Services, Microsoft Azure, or Google Cloud, among others. If an exposure can only be exploited from systems that are controlled by identity and access management (IAM) subsystems or continuous integration and continuous deployment (CICD) pipelines, the approaches herein can leverage humans or such pipelines to deploy attack software. Such limitations or requirements can be included in attack results. For example, it can be significant that an attack can only be deployed if one is able to bypass or compromise IAM or CICD.

When an exploit is executed on a target system, the results of running the exploit can be persisted or written to standard output, such as a system console. In some implementations, the results are written a database, text file, spreadsheet, etc. Various metrics can be used in gauging exploit success. These metrics can include, for example and without limitation, number of exploited paths, whether there are internal paths, external paths, or both, time taken to successfully exploit (e.g., was the attack easy to execute?), estimated time to patch a vulnerability, complexity of the exploit, ability to detect an exploit at low volumes or rates, ability to detect only at high volumes/rates, controls bypassed or loosened, severity of the exploit (e.g., PII data loss, other highly sensitive data loss, ability to conduct financial transactions or change critical system data, etc.). These metrics can be used in determining a risk level associated with a vulnerability.

Using attack results and RAG source data relating to an existing book of work, an application can establish a ranking relative to other security activities. Based on thresholds that can be defined and refined over time, subsequent actions can be taken. Subsequent actions can, based on the ranking, be automatically taken, queued for near-term execution, marked for review by security professionals, or logged as issues but considered closed. For example, actions may be automatically taken if a remediation measure is low risk, or an issue may be considered closed if a patch has already been applied or there is no viable path for exploiting a vulnerability.

In some implementations, ranking information is fed into the RAG subsystem and included as part of future LLM training. Special care can be taken to audit the results to prevent malicious results from being introduced into the data. For example, in some implementations, human review of exploit results, categorizations of the types of attacks, and/or exploit paths can be used to help highlight true areas of concern while giving lower priority or influence to results that are unrealistic. For example, even if an attack succeeds, it can be unrealistic if the attack took an excessive amount of time to carry out or was so complex that that is unlikely an attacker would be able to carry out the attack.

In some implementations, the techniques herein are used to create patches, deployment scripts, and/or monitoring. Creating these types of items can be analogous to creating a single attack pattern and/or an attack harness. A generated patch can be a software patch that directly addresses a vulnerability or can be a patch that avoids affected systems, deflects attacks, logs information, etc. That is, a patch as generated according to some implementations herein is not strictly limited to a software patch that directly addresses an identified vulnerability. For example, a patch for an SQL injection vulnerability can include, but does not necessarily include, code that closes the SQL injection vulnerability directly, but can include other mitigations, for example code that intercepts and sanitizes or drops incoming strings that are designed to carry out an SQL injection attack.

A patch does not necessary comprise code or configuration changes. For example, in some implementations, a system can generate instructions that can be carried out by a user to address a vulnerability.

As described above with respect to creating exploits, current artificial intelligence/machine learning technology is sometimes not sufficient to create patches and deployment scripts without breaking such tasks down into smaller pieces. In some implementations, code generation tasks utilize a set of code snippets that can be pieced together to create a patch, deployment script, etc. For example, if the patch is to be used to protect against API-based attacks, a stubbed service can be provided as part of a prompt. Relevant functions, fields, API calls, attack information, etc., can be provided as data elements. In some implementations, deployment scripts are built in pieces. Deployment scripts can utilize CICD pipelines where available. Deployment scripts can utilize secret stores for passwords, keys, certificates, etc. In some implementations, deployment targets are based on available exploit paths and/or which exploit paths were successfully exploited. In some implementations, RAG is used to provide examples of previous patches to the LLM, which can be used to aid in generating new patches.

In some cases, a single exposure may require multiple patches, for example to block multiple paths that malicious actors can take to exploit a vulnerability or to fully prevent or block an attempted attack. Typically, though not necessarily, the techniques herein can be used to generate a patch that is designed to stop a known exploit as early as possible. However, in some cases, a patch can be designed to allow an attacker to gain some level of access before being stopped, diverted to a decoy system, etc. A patch can be configured to stop an exploit early in an exploit path. In some cases, a patch is configured to, additionally or alternatively, stop an exploit just before a specific exposure. Allowing some level of access can offer certain benefits. For example, allowing an attack to proceed to some degree before stopping it can provide valuable information about the TTPs used by the attacker, the identity of the attacker, the location of the attacker, and so forth, which can be useful in stopping future attacks.

In some implementations, the techniques herein generate code for monitoring an exposure. Such monitoring may be particularly valuable in high risk situations, such as where there is potential for loss of PII or fraudulent transactions. In some implementations, monitoring code is built in a manner that is similar to or the same as exploit or patch code, for example leveraging artificial intelligence/machine learning models such as large language models to develop small components that are stitched together using multi-prompt approaches. In some implementations, the techniques herein provide multiple monitoring levels. Monitoring levels can include, for example, normal, debug, and/or fine-grained data capture. Debug and fine-grained capture can collect more detailed information but can come at the expense of greater system resources being consumed for monitoring activities. Debug and/or fine-grained data capture can potentially capture sensitive information such as usernames, passwords, account numbers, etc., and thus can present its own security risks. Measures can be implemented to prevent data loss during exploit attempts. For example, monitoring data can be written to a write-only log to prevent deletion of log data by malicious attackers. For example, a database can be configured to only permit insert operations but not update or delete operations, or a database can maintain a log of update or delete operations that can allow for reconstruction of a database at an earlier point in time.

Monitoring code can be standalone code (e.g., shell scripts, Python scripts, binary applications, bytecode, etc.). The techniques herein can be used, additionally or alternatively, to generate monitoring configurations for existing monitoring software. For example, many organizations use endpoint detection and response (EDR) and/or extended detection and response (XDR) systems, which can monitor and collect data from endpoints such as laptops, desktops, smartphones, tablets, servers, cloud services, email systems, network devices, etc. EDR and XDR systems typically provide functionality for setting up specific monitoring rules, alerts, etc. Such systems can be utilized to provide monitoring and/or alerting functionality.

In some implementations, monitoring code can also implement mitigation actions. For example, a monitoring script, EDR software, XDR software, etc., can be configured to disable network access, disable a port, disable a service, require a user to reset their password, or otherwise intervene when there is an attempted exploit or whenever a vulnerability is detected. In some implementations, such mitigations are undertaken when an attempt to exploit a vulnerability is detected and is not prevented by existing patches.

In some implementations, the techniques herein are used to build a library of patch, deployment, and monitoring components that can be provided to RAG data sources, vectorized, and used to improve future performance. Such information can be applied based on best fit logic. In some implementations, the techniques herein refine best fit logic during training, for example leveraging PEFT LoRA techniques to improve matches. Over time, the library can grow to support multiple patch and/or pipeline approaches. For example, the library can grow to cover multiple operating systems, languages, recovery techniques, deployment targets, layers of control, and so forth.

While artificial intelligence/machine learning models can be powerful tools for identifying exploit paths, generating patches, generating monitoring code, etc., such technologies are not infallible and there may be significant issues with patches, monitoring code, etc. In some implementations, a system can be configured to perform automated testing of patches, monitoring, etc. In some implementations, testing results can be sorted into various categories. For example, in some implementations, a system can categorize a testing result as fully remediated, partially remediated, sufficiently monitored, or unresolved. Full remediation can mean that there is a successful patch that fully mitigates the vulnerability. Partially remediated can mean, for example, that a patch partially mitigates the vulnerability. For example, partial remediation can include actions such as disabling a service, closing a port, changing permissions, etc., until a patch that directly addresses a vulnerability is ready. Sufficiently monitored can indicate that an exploit path has monitoring in place that can reliably detect attempts to exploit a vulnerability. Unresolved can indicate that an exploit path remains available.

In some implementations, the techniques herein generate multiple patches, and a best patch can be identified. Various criteria can be used to identify a best patch. The "best patch" can depend on characteristics of the vulnerability, such as the criticality of a vulnerability, the potential for exfiltration or corruption of sensitive or critical data, and so forth. The "best patch" can, additionally or alternatively, depend on characteristics of the generated patches. Some examples of criteria that can be used in determining a best patch can include, for example and without limitation, effectiveness of the patch (e.g., whether a patch fully or partially remediates a vulnerability), availability impact of the patch (e.g., can patches be applied to a running system or is a reboot required, is there a lengthy installation process, are configuration changes needed, etc.), performance impact of the patch (e.g., is a system's capacity significantly reduced or do operations take significantly longer to carry out?), and so forth.

The above actions (e.g., executing generated exploits, logging results, generating and applying patches, etc.) can, in some cases, though not necessarily, be carried out in a test environment. In some implementations, the test environment can mirror key aspects of a production environment. For example, the test environment can include systems that run the same software, have the same software versions installed, etc. User accounts on test systems can be similar to those on production systems, for example including administrator and non-administrator accounts with permissions that are the same or analogous to those used in production systems.

After creation and testing of a patch, monitoring script, etc., in a development or test environment, the patch, monitoring script, etc., can be deployed to production systems. In some implementations, patches, monitoring scripts, etc., are deployed using deployment scripts. Deployment scripts can be generated from code snippets which can be, for example, stitched together using an LLM and multi-prompt workflows, although some deployment scripts may be short enough that such approaches are not needed and a script can be generated using a single prompt. In some implementations, a system can carry out deployment using existing CICD pipelines. In some cases, human involvement may be required or preferable for deployment to certain production systems.

Even after creation and testing in a development or test environment, there may still be issues with a patch, monitoring script, etc. Accordingly, it can be significant to carry out validation actions in a production environment. In some implementations, validation is carried out in production systems to ensure that there are no unexpected production impacts. Monitoring levels can be confirmed during periods of system load, for example to ensure that monitoring activities do not unacceptably compromise performance of production systems. Monitoring levels can be confirmed during failure mode testing, for example to ensure that logs are not manipulated.

Figure 5:
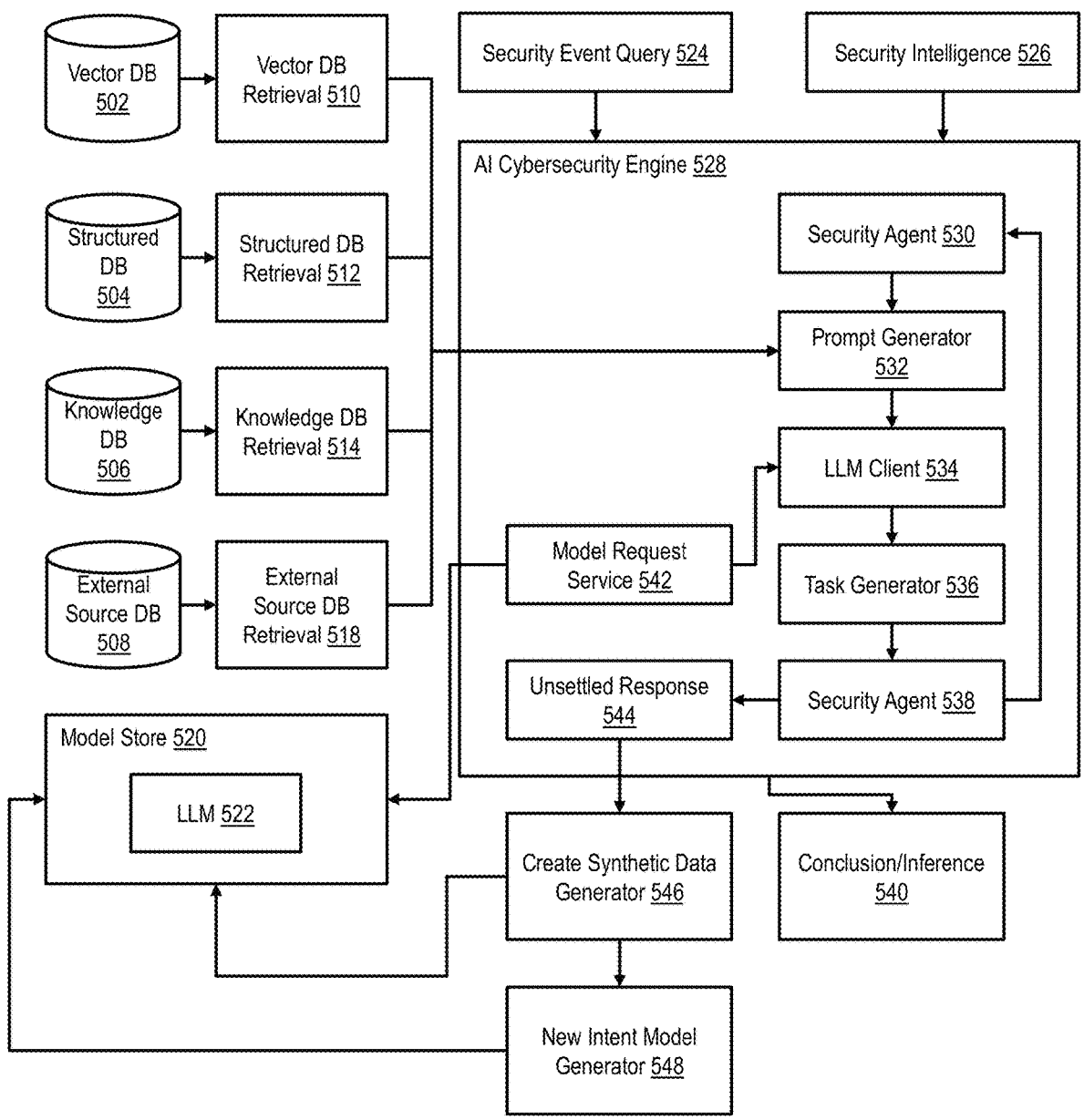
FIG. 5 illustrates an example system according to some implementations that can be used for synthesizing and testing an attack.

FIG. 5 illustrates an example system according to some implementations that can be used for synthesizing and testing an attack. The system can include a vector database 502, which can store vector representations of vulnerabilities, system information, network information, attacks, etc. The vector database can be accessed using a vector database retrieval module 510. The system can include a structure database 504 that contains structured data, such as structured data used in testing an attack function. The structured database 504 can be accessed using a structured database retrieval module 512. The system can include a knowledge database 506 that contains various information such as exploit descriptions, internal knowledge base information, and so forth. The knowledge database 506 can be accessed via a knowledge database retrieval module 514. The system can include or can access an external source database 508. The external source database can contain, for example, information accessed from third party security sources, such as CVE data. The system can include an external source database retrieval module 518 for accessing the external source database 508. In some implementations, the vector database retrieval module 510, structured database retrieval module 512, knowledge database retrieval module 514, and/or external source database retrieval module 518 can be the same module. For example, a single module can accept an input that specifies a database for retrieving data.

The system can include an AI cybersecurity engine 528 configured to receive a security event query 524 and/or security intelligence 526. The AI cybersecurity engine can include a security agent 530, a prompt generator 532 configured to generate an LLM prompt based on information retrieved from the vector database 502, the structure database 504, the knowledge database 506, and/or the external source database 508. The AI cybersecurity engine 528 can include an LLM client 534. The LLM client 534 can retrieve an LLM 522 from a model store 520 using a model request service 542. The LLM client 534 can receive a prompt generated by the prompt generator 532. The output of the LLM client 534 can be provided to a task generator 536, which can, for example, generate and/or deploy a harness for testing an exploit generated by the LLM client 534. The results of the task generator 536 can be provided to a security agent 538 (which can be the same as the security agent 530). The AI cybersecurity engine 528 can carry out operations in an iterative process, for example to test different vulnerabilities, different systems, etc. If the AI cybersecurity engine 528 reaches a conclusion, the AI cybersecurity engine 528 can output a conclusion or inference 540. The inference 540 can include, for example, an indication of a successful or unsuccessful attack, information about compromised systems, and/or the like. In some cases, the AI cybersecurity engine 528 can generate an unsettled response 544, for example when the system was unable to reach a conclusion. The unsettled response 544 can be provided to a synthetic data generator 546 to generate new data. The generated data can be stored in the model store 520. The synthetic data generator 546 can be provided to a model generator 548 which can generate a new or modified model that can be stored in the model store 520.

Figure 6:
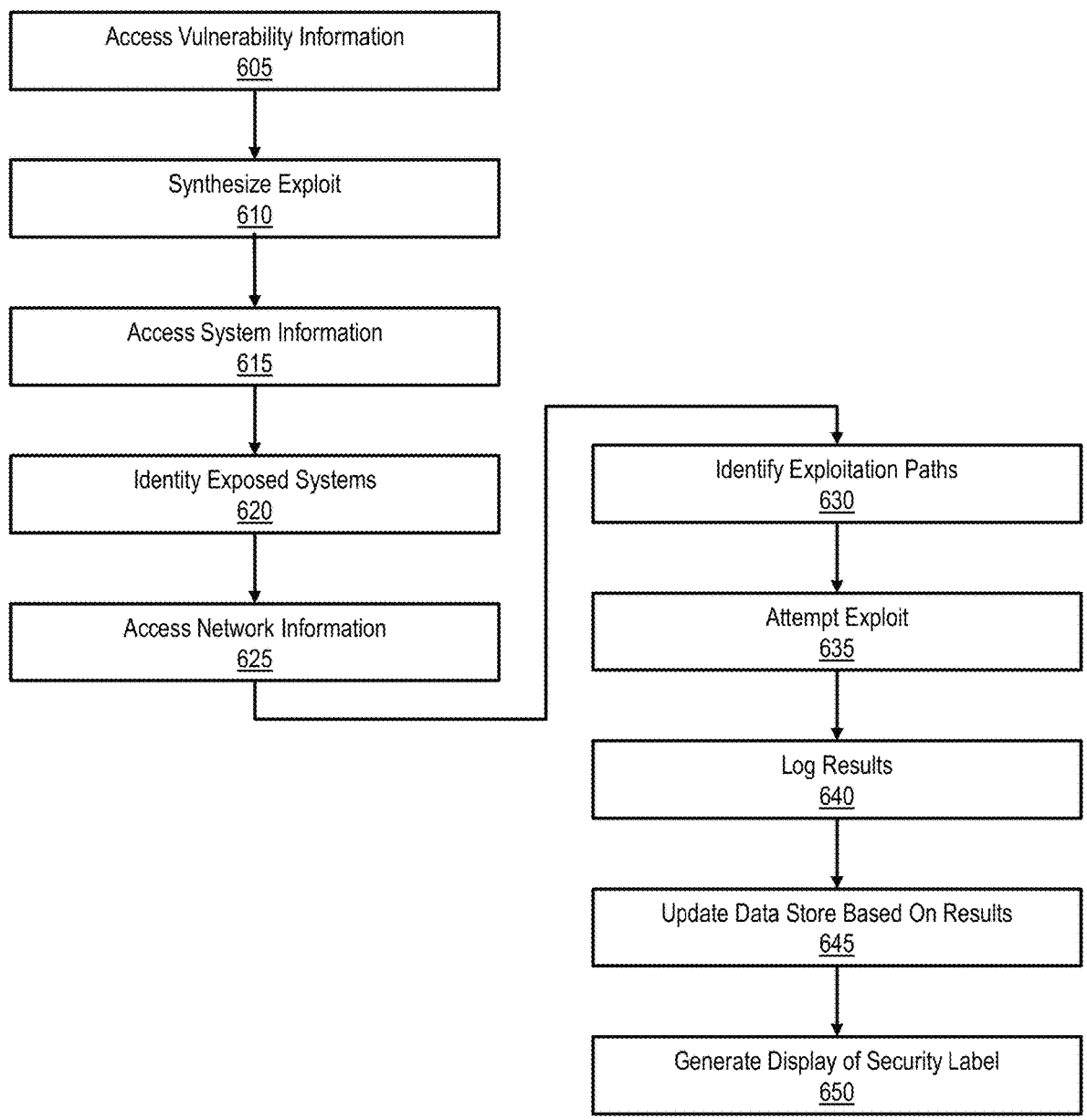
FIG. 6 is a flowchart that illustrates an example process for synthesizing and testing an attack according to some implementations.

FIG. 6 is a flowchart that illustrates an example process for synthesizing and testing an attack according to some implementations. At act 605, a system can access vulnerability information, such as CVE data, historical exploit data, MITRE CAPEC data, etc. At act 610, the system can synthesize an exploit for a vulnerability contained in the vulnerability information. In some implementations, the system can use an LLM to synthesize the exploit. In some implementations, the system can utilize RAG in synthesizing the exploit. As described herein, in some implementations, multi-prompting, chunking, and/or other techniques can be used in synthesizing the exploit. At act 615, the system can access system information, which can include information about hardware, installed software, etc. The system can, at act 620, use the accessed system information to identify exposed systems. Exposed systems can be systems that have hardware and/or software that is potentially at risk due to the vulnerability.

In some implementations, the system can identify exploitation paths. For example, the system can determine potential exploitation paths for exposed systems. At act 625, the system can access network information, which can describe, for example, how exposed systems are connected to other systems, to the internet, etc. The network information can, in some implementations, indicate open ports, exposed services, etc. At act 630, the system can, based at least in part on the accessed network information, determine one or more exploitation paths that can be used to exploit the vulnerability.

At act 635, the system can attempt to execute the synthesized exploit. For example, the system can use the identified exploitation paths to attempt to carry out the synthesized exploit against the identified exposed systems. The system can, at act 640, log the results of the exploit attempts. The logs can indicate, for example, parameters that were used during an attempt, whether or not an attempt was successful, the time taken to carry out an exploit, and/or other information relevant to the exploit. At act 645, the system can update a data store based on the log results. As described herein, the log results can be used as part of a RAG step when synthesizing exploits, identifying exploitation paths, etc. At act 650, the system can generate a security label that can be displayed to a user. The security label can include information indicative of the results of executing the synthesized exploit.

Figure 7:
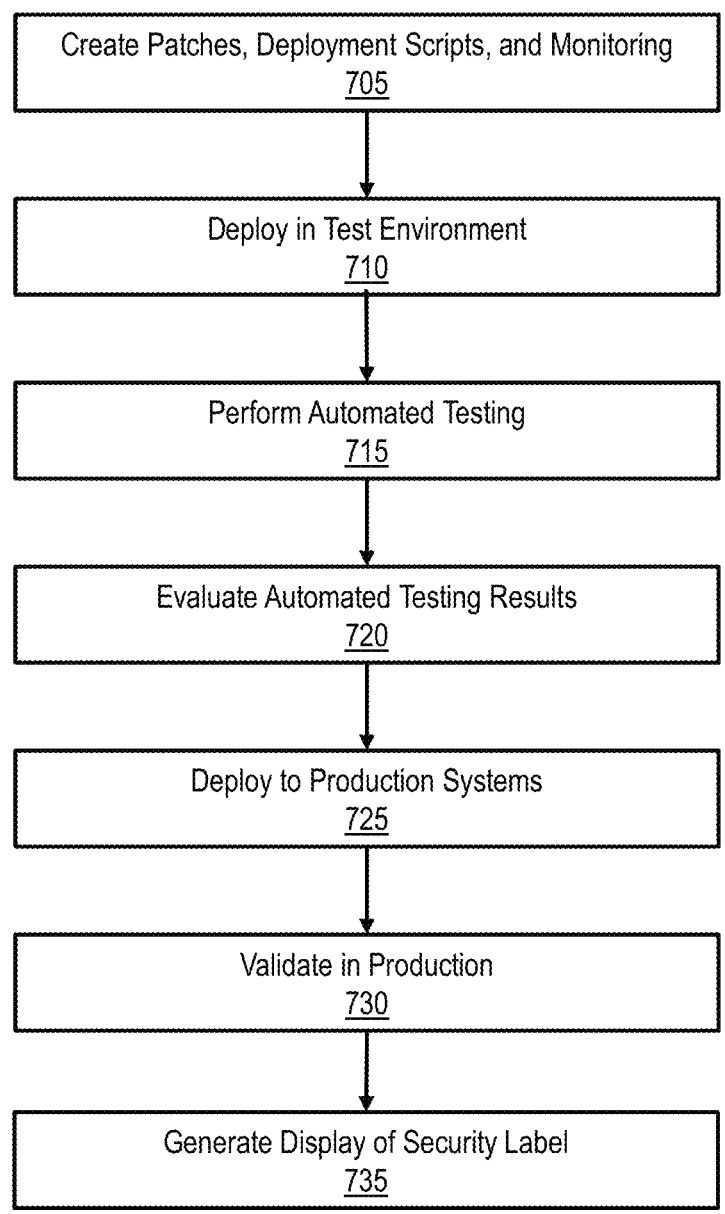
FIG. 7 is a flowchart that illustrates an example process for creating, testing, deploying, and/or monitoring patches and/or patched system according to some implementations.

FIG. 7 is a flowchart that illustrates an example process for creating, testing, deploying, and/or monitoring patches and/or patched system according to some implementations. At act 705, a system can generate a patch, deployment script, and/or monitoring script or application, for example as described herein, for example, using an LLM. At act 710, the system can deploy the patch, deployment script, and/or monitoring script in a test environment, for example using CICD processes where available. In some implementations, deployment can be carried out manually. At act 715, the system can perform automated testing. For example, a synthesized exploit can be executed against target systems in the test environment, and the results of the exploitation attempts can be logged. At act 720, the system can evaluate the automated testing results, which can indicate, for example, if target systems are still compromised, if vulnerabilities are partially mitigated, if attack attempts are properly logged (e.g., presence of key information such as IP addresses, usernames, etc., or absence of sensitive information such as account numbers, social security numbers, etc.), and so forth. At act 725, the system can, if the testing results are acceptable, deploy the patches, deployment scripts, and/or monitoring to a production environment.

As described herein, in some cases, the system can generate and test multiple patches. The system can test each generated patch and evaluate the results to select a patch for potential deployment, for example based on criteria such as vulnerability mitigation effectiveness, availability impact, performance impact, etc.

As described herein, even after successful testing in a test environment, there may still be concerns that a patch, deployment script, and/or monitoring may behave unexpectedly in a production environment or may have unanticipated downstream effects. At act 730, the system can validate the patch, deployment script, and/or monitoring in the production environment. For example, the system can process log data to determine if a vulnerability has been successfully mitigated, a patch was successfully logged, performance is not overly or unexpectedly impacted, etc. At act 735, the system can generate a security label that can be displayed to a user. The security label can include information indicative of the results of validating the patch.

FIG. 8 is a drawing that illustrates an example security label for patches according to some implementations. The security label 800 can provide an overview or summary of one or more patches, for example to indicate effectiveness of a patch, performance impact of a patch, monitoring effectiveness, etc. In FIG. 8, the security label shows information for three patches 802a, 802b, and 802c, but it will be appreciated that a security label can show information for any number of patches. In some implementations, the security label 800 can be generated after a patch testing phase or after a patch deployment phase. The security label can show a severity or risk level for various aspects 804a-804f. For example, the security label can show information for a platform, data storage, network, cryptography, etc. The security label can show the performance impact of a patch. In some implementations, the security label can show a monitoring effectiveness of the patch or monitoring code or functionality associated with the patch. The security label can display an indication of a value associated with each aspect 804. The indication can include, for example, values, shapes, colors, etc. The security label 800 can include a legend 806 that provides an explanation for shapes, colors, etc., used in the security label 800. In some implementations, the security label 800 can show an assessed risk (AR) and a mitigated risk (MR). The assessed risk can be a risk associated with a vulnerability. The risk can be low, medium, or high in FIG. 8, although other ranking approaches are possible. For example, a high risk vulnerability can be a vulnerability that is easy to exploit, has a high risk to impact production systems negatively, has a high risk of data corruption or theft, etc., while a low risk vulnerability can be a vulnerability with little potential for exploit (e.g., because it requires physical access to a system), where a successful exploit would have little or no noticeable impact on production, or where the is little or no risk of data loss or theft.

In FIG. 8, three patches for a vulnerability are depicted. In FIG. 8, the vulnerability affects networking and is assessed as high risk. The patch 802a effectively mitigates the vulnerability but, as shown in FIG. 8, has a moderate impact on performance. The patch 802b has relatively little performance impact but is worse than the patch 802a at mitigating the risk and providing effective monitoring. The patch 802c fails to vulnerability and fails to provide effective monitoring.

A security label can be presented in various forms. In FIG. 8, the security label shows assessed risks and mitigated risks for a vulnerability and multiple patches. In some implementations, a system generates a security label prior to generating patches or without considering available patches, in which case the security label may not include patch-specific information. For example, the security label can include assessed risks for one or more vulnerabilities or for one or more vulnerable systems. As an example, if systems A, B, and C are vulnerable, the security label can include columns for A, B, and C, and can be populated with values for assessed risk for A, B, and C. In some cases, the assessed risk may be the same, but can be different because, for example, different systems can have different networking configurations, access permissions, etc., can contain information that is more or less sensitive, or can be used for carrying out functions that are more or less critical to an organization. In some cases, a security label can include one or more mitigation actions that can be taken to mitigate the risk posed by a vulnerability. In some implementations, mitigation actions are not part of the security label itself but are presented in a graphical output to a user.

Providing a security label such as the one shown in FIG. 8 can be significant because, for example, while automatic patch generation can provide many benefits, such patches may not always be successful in mitigating risk, may have inadequate logging, may have unacceptable performance impacts, etc. In some implementations, the approaches herein can be used to automatically select a best patch to apply. However, even the best patch may in some cases have one or more issues such as performance impacts, and in some cases the best patch may not fully mitigate the vulnerability. Thus, it can be significant to provide a security label such as the security label 800 so that network engineers, developers, and so forth can have a better understanding of the effectiveness and impact of patches developed using the approaches described herein. In some cases, patch selection can be manual, and an engineer, developer, etc., can review a security label such as the security label 800 to aid them in determining which, if any, patch to apply.

In some implementations, the approaches herein can be used to assess end-to-end security risk for an application or platform, as described in parent application Ser. No. 18/114,194, filed Feb. 24, 2023, the contents of which are incorporated by reference in their entirety.

Figure 9:
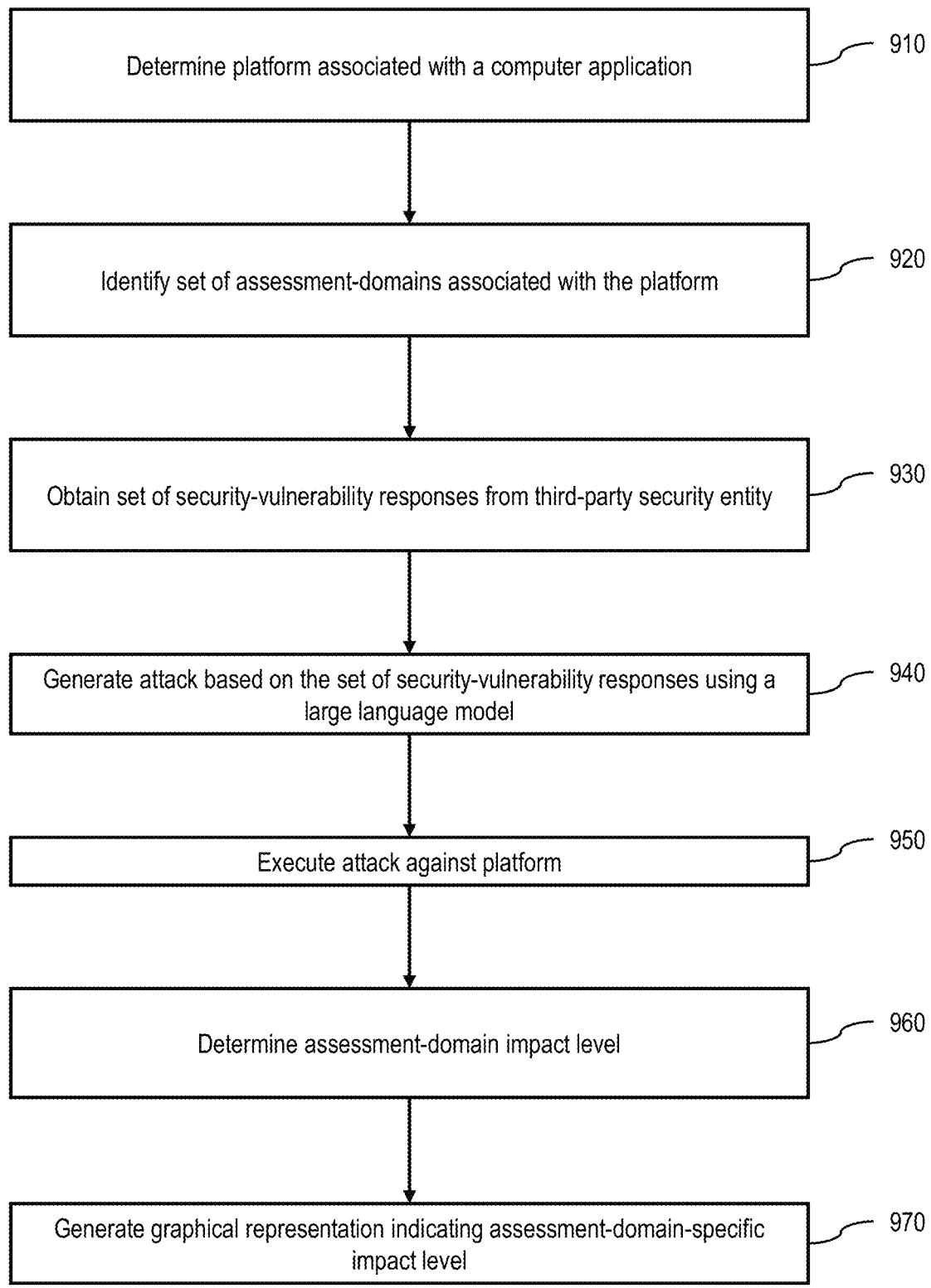
FIG. 9 is a flowchart that illustrates an example process for evaluating security of a platform according to some implementations.

FIG. 9 is a flowchart that illustrates an example process for evaluating security of a platform according to some implementations. At operation 910, a system can determine a platform associated with a computer application. The platform can indicate an ecosystem of computing resources associated with the computer application. At operation 920, the system can identify a set of assessment-domains (e.g., cryptography, network, platform, data storage, etc.) associated with the platform, for example by comparing a platform identifier of the platform to assessment-domain-mapping data structure. At operation 930, the system can obtain a set of security-vulnerability responses (e.g., vulnerability data such as CVE data) from a third-party security entity. The set of security-vulnerability responses can indicate a security threat (e.g., a vulnerability) associated with the platform, for example, a security vulnerability affecting at least one of the computing resources associated with the application. At operation 940, the system can generate an attack based on the set of security-vulnerability responses using a large language model, as described herein. At operation 950, the system can execute the attack against the platform, for example against one or more computing resources associated with the application. At operation 960, the system can evaluate the results of executing the attack (e.g., log data that indicates whether or not an attack was successful, whether sensitive information was exposed, etc.), to determine an assessment-domain impact level for one or more of the assessment-domains associated with the platform. At operation 970, the system can generate a security label that indicates one or more assessment-domain-specific impact levels.

External Data Integrity

While the approaches described herein can be effective for identifying vulnerable systems, synthesizing attacks, synthesizing patches, and so forth, such approaches can rely on external data, such as CVE data or other security information from third party sources. Malicious actors thus can have a strong motivation to interfere with data sources used to synthesize attacks, patches, etc. Such interference can occur in various ways, such as man-in-the-middle attacks, in which an attacker intercepts communications between a client and server and interferes with data during transmission, modification by malware installed on a client device, and so forth. In some cases, an attacker may compromise a server that makes data available to clients. In some cases, files can be modified by, for example, a router or other networking hardware that is compromised or intentionally designed to intercept and/or modify data during transmission.

Various techniques exist to ensure data integrity during transmission. For example, man-in-the-middle attacks can, in some cases, be detected if an invalid, mismatched, untrusted, and/or self-signed SSL/TLS certificate is detected. Verifying SSL/TLS certificates can reduce the likelihood that a man-in-the-middle attack is successful, although there is still potential for attacks to be missed.

In some implementations, a system can be configured to retrieve information (e.g., CVE data) from an external source. In some implementations, the system can compute a checksum or hash associated with the retrieved information. Various algorithms exist, such as MD5 and SHA (e.g., SHA-1, SHA-2, etc.) to compute hash values. In some implementations, MD5 hashes can be used to verify integrity; however, MD5 is known to have relatively weak collision resistance. That is, it is possible to have two different inputs (e.g., two different files) that have the same MD5 hash. In some implementations, SHA (e.g., SHA-2) can be preferred. SHA algorithms are typically more resistant to collisions and thus can be more suitable for critical operations such as verifying the integrity of retrieved security information. Some data providers may make hashes available to users. For example, hashes can be posted on a website, made available via an API, etc. In some implementations, a system can be configured to compute a hash value associated with a downloaded file and to compare the computed hash value to a hash value supplied by a data provider. If a difference is detected, this can indicate that the file was tampered with or may simply indicate that there was an error during transmission of the file. In some implementations, if a system detects a difference, the system can automatically redownload the file and determine a new hash value. If the hash value still differs from the hash value supplied by the data provider, the system can reject the file. In some implementations, when a system detects a difference in hash values, the system can generate an alert and/or take other actions.

There can be many reasons that a hash value differs from that supplied by a data provider. Some of these reasons may be benign, such as file transmission errors as described above, or a process of updating a hash value on a website or in a database being skipped, broken, etc. In other cases, hashes may differ because a data source itself has been compromised, data has been compromised during transmission (e.g., a man-in-the-middle attack), or because a receiving device is infected with malware that modified the downloaded file. Thus, in some implementations, a hash difference can indicate that an organization's own systems are compromised.

While computing hash values and comparing them to values provided by a data supplier can offer some protection against tampering, such an approach is not foolproof. For example, an attacker who is able to compromise a file may also be able to compromise a hash value that is posted on a website, in which case comparing hash values may not indicate that a file has been tampered with.

In some cases, files can be digitally signed, which can help to verify the integrity and authenticity of a file. Digital signatures can use asymmetric cryptography to ensure that a file has not been modified and/or that it originates from a trusted source. However, digital signatures may, in some cases, be insufficient to detect tampering. For example, digital signatures rely on asymmetric cryptography, where a signer signs using a private key and a recipient verifies the signature using a corresponding public key. If the private key is compromised, an attacker may be able to sign compromised or malicious files using the private key. In some cases, an attacker may not need access to a private key but may instead use social engineering techniques to obtain digital signatures. For example, a malicious actor may dupe someone with access to a private key into signing an arbitrary file, for example by posing as another employee.

Hashing, signature verification, or SSL/TLS certificate verification can be valuable tools for verifying that received data has not been tampered with. In some implements, these techniques can be combined to improve resilience against malicious actors.

In some implementations, other verification approaches may be used. For example, a system can be configured to process vulnerabilities and determine if there are inconsistencies or errors in the vulnerability data. For example, in some implementations, retrieved vulnerability information can be compared against an earlier, known-good version of the vulnerability information, in which case it can be expected that there are new entries but that previous entries should be unchanged. If the system detects a difference in an entry that exists in both the known-good version and the retrieved version, this can indicate that the retrieved version has been compromised. As another example, if the system detects a vulnerability in the known-good version that is not present in the retrieved version, this can indicate that the retrieved version is incomplete or has been modified.

Other approaches are possible. For example, in some implementations, a system can record typical transfer speeds, latencies, etc., associated with retrieving certain information from external sources. Each time information is retrieved from an external source, the latency, transfer speed, etc., can be compared against historical values. If there is a significant difference (e.g., a significantly higher latency), this can indicate that, for example, a request to retrieve information from the external source was redirected from the real source to an alternative, potentially malicious source. While this can be a powerful technique, it can be subject to false positives, as differences may occur for various reasons, such as network outages, network congestion, being routed to a different content delivery server, etc.

Figure 10:
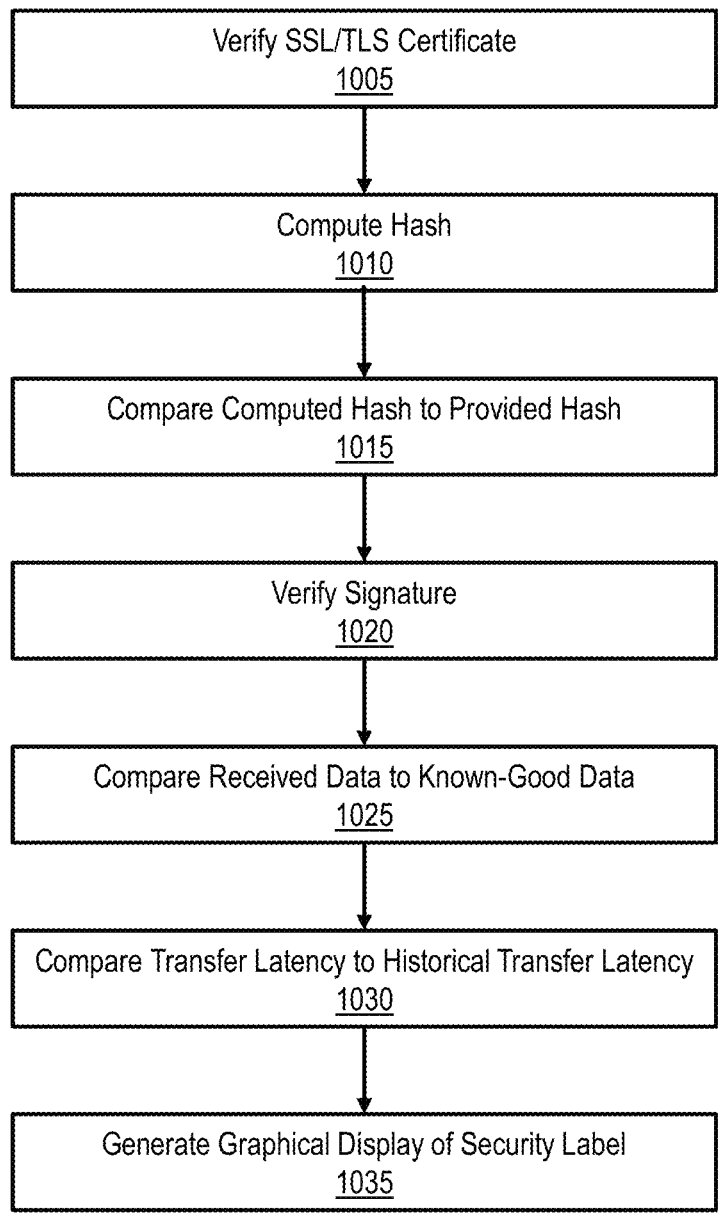
FIG. 10 is a flowchart that illustrates an example process for verifying data integrity according to some implementations.

FIG. 10 is a flowchart that illustrates an example process for verifying data integrity according to some implementations. At act 1005, a system can verify an SSL/TLS certificate, for example checking who the certificate is issued to, whether or not the certificate is self-signed, etc. At act 1010, the system can compute a hash (e.g., SHA-256 or SHA-512) for a downloaded file and can, at act 1015, compare the computed hash to a provided hash, for example a hash provided on a website of a data provider. At act 1020, the system can verify a signature of the file. For example, if the file was not signed with the correct private key, verification using the corresponding public key can fail. At act 1025, the system can compare received data to known-good data, for example to a previous version of the data to identify any changes that can be indicative of tampering. At act 1030, the system can compare transfer latency to historical transfer latency, which can indicate that a file was actually delivered from a different server than is typical. At act 1035, the system can generate a security label that can be displayed to a user.

Not all verification measures may be applicable in all situations. For example, some data sources may provide hashes while other may not, or some may provide signed files while others may not. The particular measures used to verify data integrity thus may vary from data source to data source.

FIG. 11 is a drawing that shows an example security label for data retrieval according to some implementations. The security label 1100 can provide an overview that indicates if any problems or deviations were observed with retrieved data. The security label 1100 can indicate a severity or risk level associated with problems or deviations. In FIG. 11, three data sources 1102a, 1102b, and 1102c are shown, but there can be more data sources or fewer data sources. Data sources can include, for example, CVE data or any other data as described herein. Various criteria can be shown in the security label 1100. For example, in FIG. 11, the security label shows an overall score 1104a, a hash subscore 1104b, a signature subscore 1104c, a latency subscore 1104d, and a comparison subscore 1104e. In some implementations, the overall score can be computed from the subscores. For example, the overall score can be an average of the subscores. In some implementations, the overall score can be based on the worst (e.g., highest risk) subscore. In some implementations, scores and subscores can be represented numerically. In some implementations, scores and subscores can be represented categorically, for example using shapes and/or colors, as shown in FIG. 11, or using words (e.g., "High," "Medium," and "Low"). The security label 1100 can include a legend 1106 that provides an explanation for the content shown in the security label 1100. Each subscore can be represented by an indicator 1108. The indicator can be a graphic, color, text, number, letter rating, etc. In some cases, not all subscores may be applicable. For example, in FIG. 11, the data source 1102a and 1102c do not sign their files, so the signature subscore is not populated with a value. In FIG. 11, no issues were detected with the data source 1102a.

A transfer from data source 1102b showed unusual latency, which could indicate an attempt to tamper with a file in transmission or to provide the file from a different server. The hash for data obtained from data source 1102c does not match a hash published by the provider of the data, which indicates a high risk as this could indicate that the file was corrupted in transmit or has been tampered with.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A method for determining platform-specific end-to-end security vulnerabilities, the method comprising:
   determining a platform associated with a computer application, wherein the platform indicates an ecosystem of computing resources associated with the computer application;
   identifying a set of assessment-domains associated with the platform by comparing a platform identifier of the platform to an assessment-domain-mapping data structure;
   obtaining, from a third-party security entity, a set of security-vulnerability responses indicating a security threat associated with the platform;
   generating an attack based on the set of security-vulnerability responses using a large language model, wherein the attack comprises executable code;
   executing the attack against the platform;
   determining, based on a result of executing the attack, an assessment-domain impact level for an assessment-domain of the set of assessment-domains associated with the platform; and
   generating for output, a representation indicating at least one assessment-domain-specific impact level.

2. The method of claim 1, wherein generating the attack comprises:
   extracting a set of features associated with the security threat from the set of security-vulnerability responses, wherein the set of features are indicative of one or more of: an affected software, an affected software version, an affected file, a type of vulnerability, an attack vector, required privileges, or user interaction requirements;
   generating, based at least in part on the extracted set of features, a software attack comprising the executable code,
      wherein the executable code is generated using the large language model,
      wherein the large language model is configured to:
         access supporting information from a data store, the supporting information comprising a code snippet used for generating the executable code;
         receive a prompt comprising at least the set of features; and
         generate the executable code using the prompt, wherein the executable code comprises an attack function configured to accept a data element as an input to the attack function.

3. The method of claim 1, wherein executing the attack against the platform comprises:
   accessing network information comprising information related to a network connection of the platform;
   determining, using the network information, an exploitation path indicating an ordered set of actions that can be taken to execute the attack against the platform;
   identifying a security control in the exploitation path, wherein the security control comprises one or more of: a permission or a firewall; and
   executing the generated attack against the platform using the determined exploitation path, wherein the exploitation path bypasses the security control.

4. The method of claim 1, further comprising:
   generating a patch for the security threat using the large language model;
   applying the patch to the platform;
   testing the patch, wherein testing the patch comprises executing the attack against the platform; and
   logging results of the testing.

5. The method of claim 4, further comprising:
   generating a graphical output comprising a summary of the logged results.

6. The method of claim 4, further comprising:
   determining, based on the logged results, a success of the patch;
   deploying the patch to a production system different from the platform;
   monitoring the production system; and
   validating, based on the monitoring, the patch, wherein validating the patch comprises determining that the patch accomplishes at least one of:
   preventing exploitation of the security threat or detecting an attempt to exploit the security threat.

7. The method of claim 1, wherein the determining the assessment-domain impact level for the assessment-domain comprises:
   determining a risk level associated with the platform, wherein the risk level is based on at least one of: number of exploited paths, a presence of external exploitation paths, time taken to exploit, time to patch, attack complexity, detection capability, or exploit severity;
   determining, based at least on part on the risk level associated with the platform, a priority for patching the platform.

8. The method of claim 1, further comprising:
   verifying integrity of the set of security-vulnerability responses, wherein verifying the integrity of the set of security-vulnerability responses comprises at least one of: verifying an SSL/TLS certificate, comparing a computed hash to a provided hash, verifying a signature associated with the vulnerability data, compared the vulnerability data to known-good vulnerability data, or comparing transfer latency associated with accessing the vulnerability data to historical transfer latency.

9. A method for generating and testing a vulnerability exploit, the method comprising:
   accessing vulnerability data from a first vulnerability data source;

identifying a vulnerability included in the vulnerability data;
extracting a set of features associated with the vulnerability from the vulnerability data, wherein the set of features are indicative of one or more of: an affected software, an affected software version, an affected file, a type of vulnerability, an attack vector, required privileges, or user interaction requirements;
generating, based at least in part on the extracted set of features, a software attack comprising executable code, wherein the executable code is generated using a large language model,
wherein the large language model is configured to:
access supporting information from a data store, the supporting information comprising a code snippet used for generating the executable code;
receive a prompt comprising at least the set of features; and
generate the executable code using the prompt, wherein the executable code comprises an attack function
configured to accept a data element as an input to the attack function; and
execute the generated attack on an exposed system.

10. The method of claim 9, further comprising:
accessing system information comprising at least one of: operating system, operating system version, installed software, installed software version, installed library, or installed library version;
identifying, based on the system information, the exposed system, wherein the exposed system is impacted by the vulnerability.

11. The method of claim 9, further comprising:
accessing network information comprising information related to a network connection of the exposed system;
determining, using the network information, an exploitation path indicating an ordered set of actions that can be taken to execute the generated exploit against the exposed system;
identifying a security control in the exploitation path, wherein the security control comprises one or more of: a permission or a firewall; and
executing the generated attack against the exposed system using the determined exploitation path.

12. The method of claim 9, further comprising:
generating a patch for the vulnerability using the large language model, wherein the patch is based on at least one of: the generated attack, the vulnerability data, or a result of executing the generated attack on the exposed system;
applying the patch to the exposed system;
testing the patch, wherein testing the patch comprises executing the exploit against a patched version of the exposed system;
logging results of the testing; and
evaluating the results of the testing, wherein the evaluation comprises measuring one or more of: mitigation effectiveness, performance impact, or logging.

13. The method of claim 12, further comprising:
generating a graphical output comprising a summary of the results of the testing.

14. The method of claim 12, further comprising:
determining, based on the results of the testing, a success of the patch;
deploying the patch to a production system different from the exposed system;
monitoring the production system; and
validating, based on the monitoring, the patch, wherein validating the patch comprises determining that the patch accomplishes at least one of:
preventing exploitation of the vulnerability or detecting an attempt to exploit the vulnerability.

15. The method of claim 12, further comprising
determining a risk level associated with the exposed system, wherein the risk level is based on at least one of: number of exploited paths, a presence of external exploitation paths, time taken to exploit, time to patch, attack complexity, detection capability, or exploit severity;
determining, based at least on part on the risk level associated with the exposed system, a priority for patching the exposed system.

16. The method of claim 9, further comprising:
verifying integrity of the vulnerability data, wherein verifying the integrity of the vulnerability data comprises at least one of: verifying an SSL/TLS certificate, comparing a computed hash to a provided hash, verifying a signature associated with the vulnerability data, compared the vulnerability data to known-good vulnerability data, or comparing transfer latency associated with accessing the vulnerability data to historical transfer latency.

17. A system for generating and testing a vulnerability exploit, the system comprising:
at least one hardware processor; and
at least one non-transitory memory storing instructions, which, when executed by the at least one hardware processor, cause the system to:
access vulnerability data from a first vulnerability data source;
identify a vulnerability included in the vulnerability data;
extract a set of features associated with the vulnerability from the vulnerability data, wherein the set of features are indicative of one or more of: an affected software, an affected software version, an affected file, a type of vulnerability, an attack vector, required privileges, or user interaction requirements;
generate, based at least in part on the extracted set of features, a software attack comprising executable code,
wherein the executable code is generated using a large language model,
wherein the large language model is configured to:
access supporting information from a data store, the supporting information comprising a code snippet used for generating the executable code; and
receive a prompt comprising at least the set of features; and
generate the executable code using the prompt, wherein the executable code comprises an attack function configured to accept a data element as an input to the attack function; and
execute the generated attack at an exposed system, wherein executing the generated attack on the exposed system comprises:
accessing system information comprising at least one of: operating system, operating system version, installed software, installed software version, installed library, or installed library version;
identifying, based on the system information, the exposed system, wherein the exposed system is impacted by the vulnerability.

18. The system of claim 17, wherein the instructions are further configured to, when executed by the at least one hardware processor, cause the system to:
- access network information comprising information related to a network connection of the exposed system;
- determine, using the network information, an exploitation path indicating an ordered set of actions that can be taken to execute the generated exploit against the exposed system;
- identify a security control in the exploitation path, wherein the security control comprises one or more of: a permission or a firewall; and
- execute the generated attack against the exposed system using the determined exploitation path.

19. The system of claim 18, wherein the instructions are further configured to, when executed by the at least one hardware processor, cause the system to:
- generate a patch for the vulnerability using the large language model;
- apply the patch to the exposed system;
- test the patch, wherein testing the patch comprises executing the exploit against a patched version of the exposed system; and
- log results of the testing,
- wherein the patch is configured to enable detection of an attempt to exploit the vulnerability by a monitoring software application installed on the exposed system.

20. The system of claim 19, wherein the instructions are further configured to, when executed by the at least one hardware processor, cause the system to:
- generate a graphical output comprising a summary of the results of the testing, wherein the graphical output indicates how an end-to-end system would behave if the exploit was implemented;
- determine one or more mitigation actions for the exposed system; and
- provide a graphical output comprising the one or more mitigation actions.

* * * * *